United States Patent [19]

Noji et al.

[11] Patent Number: 5,008,557
[45] Date of Patent: Apr. 16, 1991

[54] POSITION DETECTOR FOR MOVING VEHICLE

[75] Inventors: Akio Noji; Kenji Kamimura; Sadachika Tsuzuki, all of Saitama, Japan

[73] Assignee: Honda Giken Kogyo Kabushiki Kaisha, Tokyo, Japan

[21] Appl. No.: 484,041

[22] Filed: Feb. 23, 1990

[30] Foreign Application Priority Data

Mar. 1, 1989 [JP] Japan ................................ 1-46408

[51] Int. Cl.$^5$ ...................... G01N 21/86; G01V 9/04
[52] U.S. Cl. ................................ 250/561; 250/235; 180/169; 356/141; 364/424.02
[58] Field of Search ............. 250/235, 236, 561; 180/167-169; 340/988, 989; 356/141, 152; 364/424.02, 424.01, 443, 444, 449

[56] References Cited

U.S. PATENT DOCUMENTS

| | | | |
|---|---|---|---|
| 4,099,591 | 7/1978 | Carr | 340/988 |
| 4,309,758 | 1/1982 | Halsall | 364/424.02 |
| 4,328,545 | 5/1982 | Halsall et al. | 356/152 |
| 4,626,995 | 12/1986 | Lofgren et al. | 180/169 |
| 4,647,784 | 3/1987 | Stephens | 250/561 |
| 4,700,301 | 10/1987 | Dyke | 364/424.02 |
| 4,713,767 | 12/1987 | Sato et al. | 364/444 |
| 4,796,198 | 1/1989 | Boultinghouse et al. | 250/561 |
| 4,817,000 | 3/1989 | Eberhardt | 180/169 |
| 4,846,297 | 7/1989 | Field et al. | 356/141 |
| 4,947,324 | 8/1990 | Kamimura et al. | 364/424.02 |

*Primary Examiner*—David C. Nelms
*Assistant Examiner*—Stephone B. Allen
*Attorney, Agent, or Firm*—Pollock, VandeSande and Priddy

[57] ABSTRACT

A position-detecting system for a moving vehicle wherein the position of the moving vehicle is detected by scanning the light beam emitted from a light beam-emitting means mounted on the moving vehicle in the circumferential direction centering around the moving body, and receiving the light beam reflected from light-reflecting means disposed at at least three positions by means of a light-receiving means mounted on the moving vehicle, comprising a means for detecting the distance between the source of the reflected light received at the light-receiving means and the moving vehicle, and a means for reducing the rotational speed of the light beam scanning means in response to the operation of the distance detecting means.

11 Claims, 17 Drawing Sheets

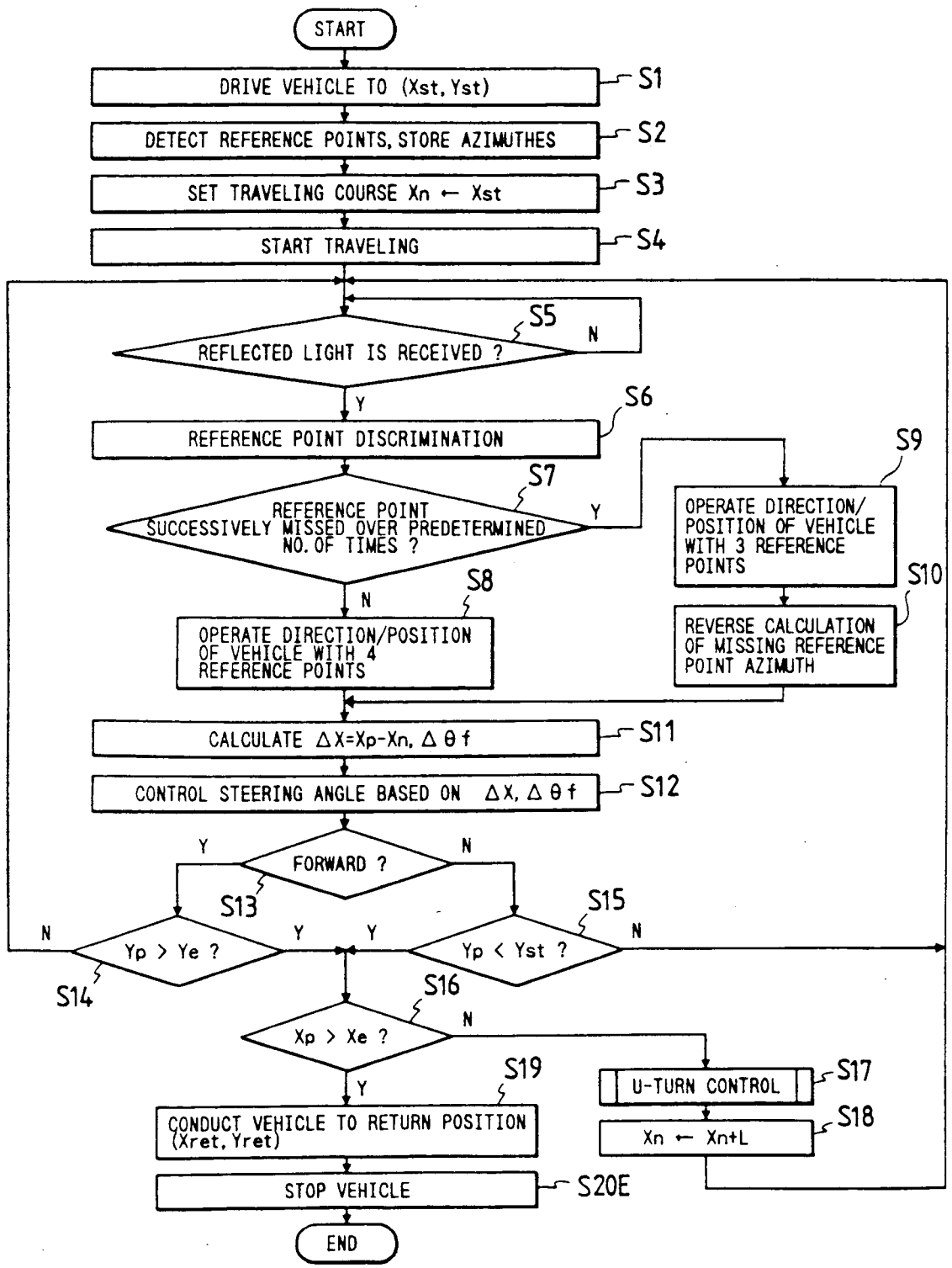

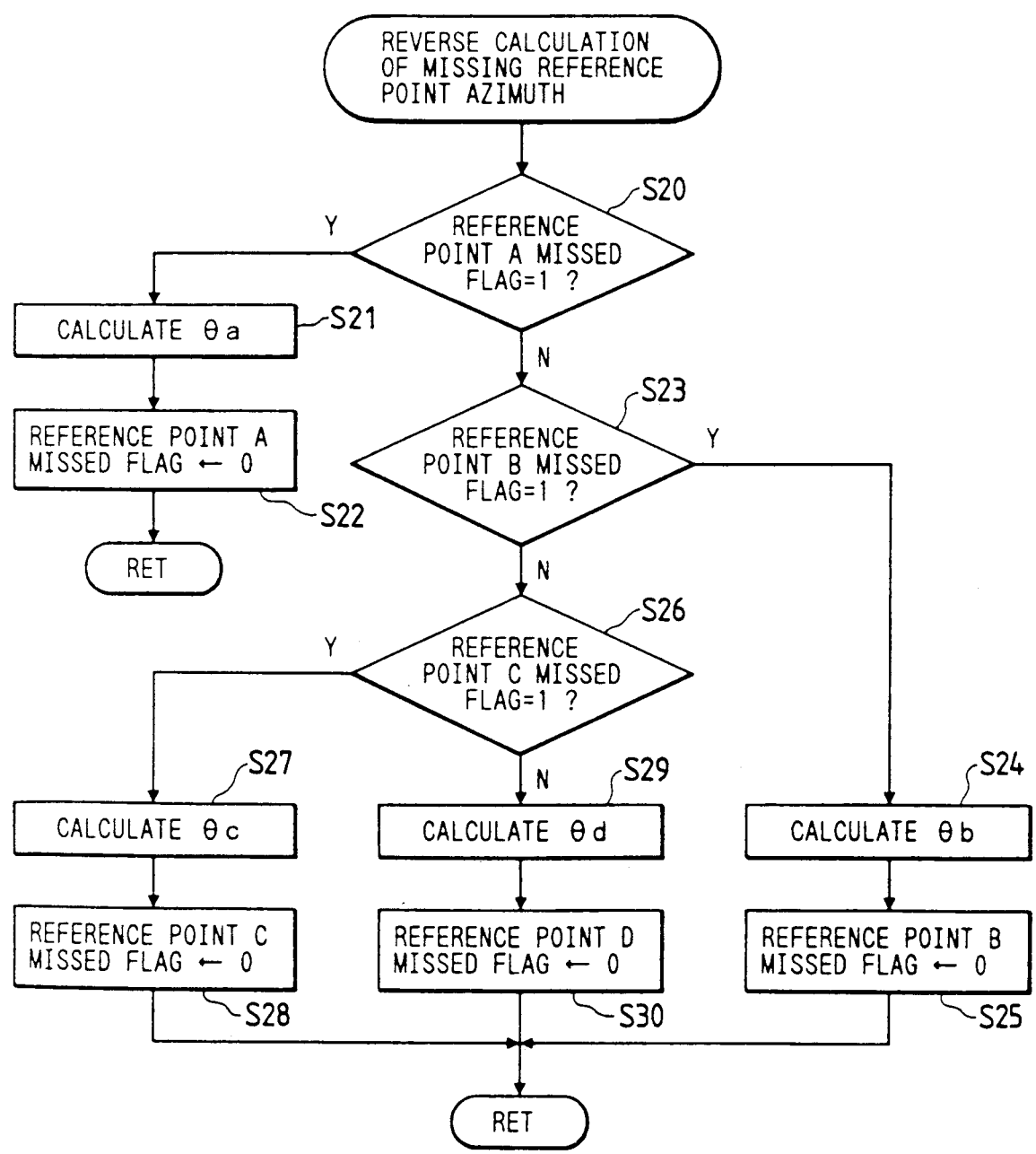

POSITION DETECTOR FOR MOVING VEHICLE

BACKGROUND OF THE INVENTION

1. Field of the Invention

The present invention relates to a position detector for a moving vehicle, and more particularly to a position detector for traveling a moving automobile, an unmanned mobile and carrying device in a factory, or a steering vehicle for use in agriculture, civil engineering machinery and the like along a predetermined traveling course.

2. Description of the Prior Art

Heretofore, as a system for detecting a present position of a moving body such as the moving vehicles as described above, there has been proposed a system provided with a means for scanning light beam emitted from a moving body in the circumferential direction or every azimuthal directions centering around the moving body, light-reflecting means for reflecting to return the light beam in the direction of incident light and positioned at least three positions apart from the moving body, and a beam receiver means for receiving light reflected from the light-reflecting means (the Japanese Patent Laid-open No. 67476/1984).

In the above mentioned prior art, differential azimuthes between adjoining two of three light-reflecting means centering around the moving body are detected on the basis of received beam output of the light-receiving means, then a position of the moving body is operated based on the detected differential azimuthes and positional information of the light-reflecting means which have been previously set.

Also, the present inventors proposed in U.S. Ser. No. 344,574 a control system which, different from the above described system wherein the positional informations of the light-reflecting means are preset, detects the distances between a moving body or a moving vehicle and the light-reflecting means and, based on the detected distances and the differential azimuthes, operates the positions of the light-reflecting means thereby to detect the position of the moving vehicle.

In that control system, if there are some unexpected light-reflecting objects other than the expected light-reflecting means in the neighborhood of the area in which the moving vehicle travels, the light-receiving means may receive the light reflected from the unexpected light-reflecting objects. For this, the present inventors proposed in U.S. Ser. No. 413,934, an improved control system which predicts the azimuth at which light-reflecting means is to be detected in the next scan, based on the azimuth (the angle formed between the advance direction of the moving vehicle and the direction of the light-reflecting means) at which the light-reflecting means has been detected the current and last scans, and determines that the light incident upon the light-receiving means within the predicted azimuth is the normal reflected light from the expected light-reflecting means. However, in that control system, if the difference between the azimuth of the expected light-reflecting means as viewed from the moving vehicle and the azimurth of other reflecting object is large, both can be discriminated from each other, whereas there are cases that they can not be discriminated and the normal light-reflecting means can not be detected if the azimuthes of the two were close to each other and the both of two are included in a predicted angle range.

That is, since the predicted azimuth has a predetermined detection range there is a problem that if the azimuthes of the expected light-reflecting means and the unexpected reflecting object are close to each other, the reflected lights from the two are naturally detected in the predetermined detection range.

If a plurality of incident lights are received in the detection range as mentioned above, the distance between the source of each incident lights and the moving vehicle is measured, the source which is nearest to the moving vehicle is determined to be the expected light-reflecting means, and based on the azimuth of this light-reflecting means, the position of the moving vehicle can be detected (Japanese Patent Application Serial No. 46407/1989). The above mentioned detection method requires the assumption that obstacles such as unexpected reflecting objects existing in the limited range such as the area in which the moving vehicle travels have been removed before the work is begun, and it has an advantage that, in practice, the above-mentioned problem can be removed by a simple control system.

In the above described prior art, measurement of the distance between the moving vehicle and the light-reflecting means is performed on the basis of the phase difference between the light beam generated in the light beam emitting means mounted on the moving vehicle and the incident light reflected by the light-reflecting means or other light-reflecting object.

In this method, since the light-receiving level varies if the distance between the moving vehicle and the light-reflecting means or other unexpected reflecting object differs, time is required for level matching of the light beam generated at the light beam emitting means and the incident light for detecting the phase difference. Also, time is required for the operation of the distance and the like. Therefore, if the scanning speed of the light-receiving means is made slow so that the time from the reception of one incident light to the reception of the next incident light is set as long as possible, it is convenient for adjustment of the incident light level and distance operation, etc.

On the other hand, however, there is a problem that, if the rotational speeds of the light beam emitting means and light-receiving means for scanning is slow with respect to traveling speed of the moving vehicle, time difference of azimuth detection occurs between each light-reflecting means or objects, whereby the precision of positional detection is reduced. There is requirement to increase the number of revolutions of the light beam emitting means and light-receiving means (the rotational speed of the light beam scanning means) in order to reduce the time difference in the azimuth detection.

As described above, there is a problem that the two requirements incompatible with each other must be fulfilled in order to improve the prior art.

SUMMARY OF THE INVENTION

It is an object of the present invention to overcome the above problem and provide a position detection system for moving vehicle which can sufficiently satisfy the azimuth detecting function of each light-reflecting means and add a distance measuring function with a high precision.

The present invention is characterized in that in a position-detecting system for a moving vehicle wherein the position of the moving vehicle is detected by scanning the light beam emitted from a light beam-emitting means mounted on the moving vehicle in the circumferential direction centering around the moving body, and receiving the light beam reflected from light-reflecting means disposed at least three positions by means of a light-receiving means mounted on the moving vehicle, comprising a means for detecting the distance between the source of the reflected light received at the light-receiving means and the moving vehicle, and a means for reducing the rotational speed of the light beam scanning means in response to the operation of the distance detecting means.

In the present invention having the above described construction, when a need for measuring the distance between the moving vehicle and light-reflecting means occurs, the rotational speed of means for scanning the light beam is automatically reduced, and when there is no need for measuring the distance, the light beam is scanned at the original relatively high speed and the reflected lights from light-reflecting means can be received sequentially at a high rate.

BRIEF DESCRIPTION OF THE DRAWINGS

FIG. 3 is a flowchart showing a steering control;

FIG. 4 constituting

FIG. 5 is a flowchart showing a processing for reverse calculation of the azimuthes of the missing reference point;

FIG. 6 constituting

FIG. 7 constituting

FIG. 13 constituting

DETAILED DESCRIPTION OF THE PREFERRED EMBODIMENTS

Figure 12:
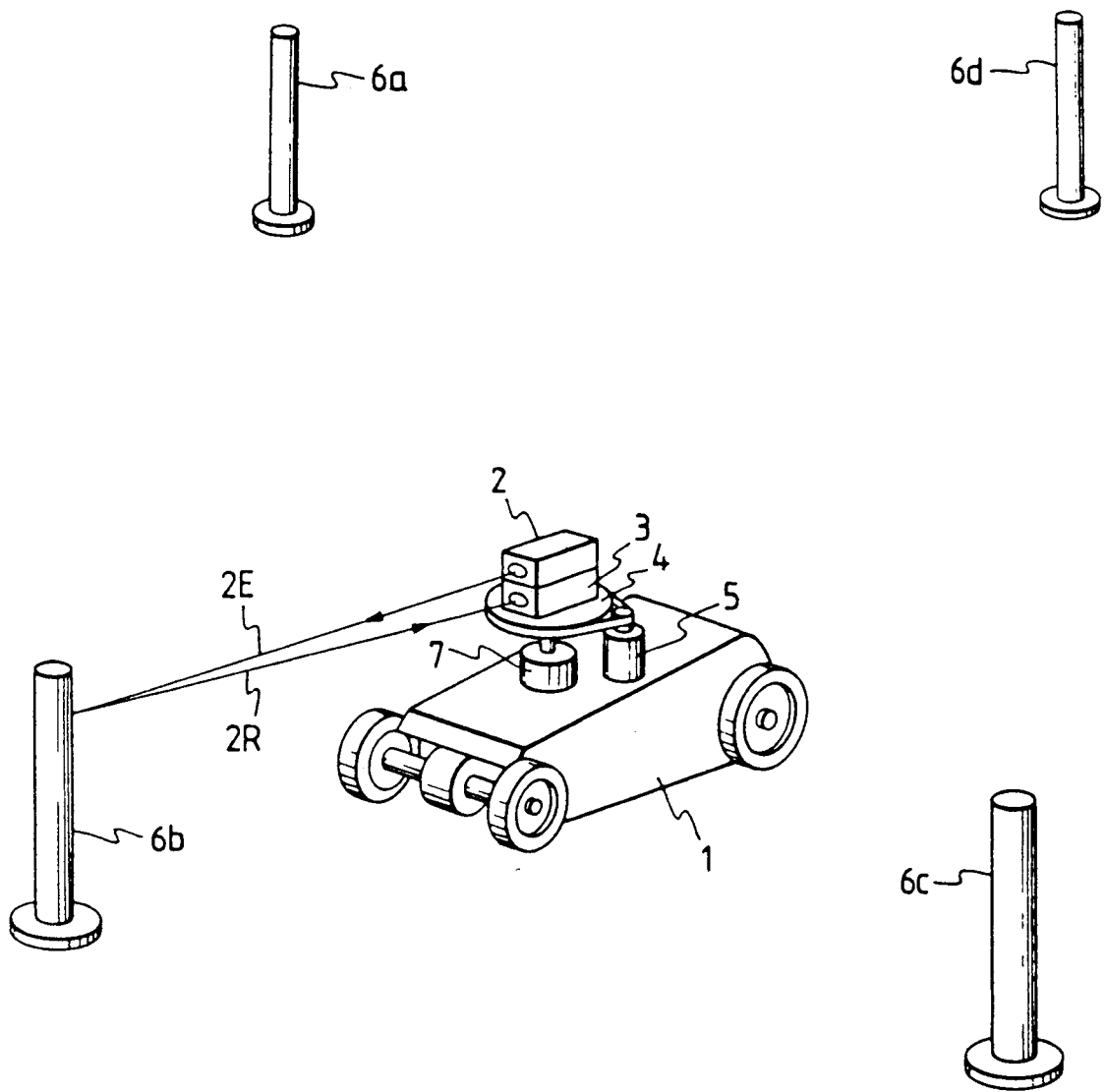
FIG. 12 is a perspective view showing a situation of arrangement of the moving vehicle and reflectors.

An embodiment of the present invention will be described hereinbelow by referring to the accompanying drawings. FIG. 12 is a perspective view showing a state of arrangement in respect of a moving vehicle carrying the control system according to the present invention and each of light reflectors disposed in an area in which the moving vehicle travels.

In FIG. 12, the moving vehicle 1 is one for use in agricultural working such as a lawn mower and the like. A rotating table 4 driven by a motor 5 is mounted on the upper part of the moving vehicle 1. The rotating table 4 mounts a beam source 2 for emitting light beam 2E and a beam receiver 3 for receiving light 2R reflected by each of the reflectors 6a-6d for reflecting the light beam 2E. The beam source 2 is provided with a light beam emitting means (light-emitting diode) and the beam receiver 3 is provided with a means for receiving incident light to convert it into an electrical signal (photodiode) (both of them are not shown). Furthermore a rotary encoder 7 is disposed so as to be interlocked with a drive shaft of the rotating table 4, so that when pulses output from the rotary encoder are counted, a turning angle of the rotating table 4 can be detected.

The reflectors 6a-6d are located around a working area of the moving vehicle 1. Each of the reflectors 6a-6d has a reflection surface reflecting incident light in the incident direction and for this purpose, a so-called corner cube prism which has been conventionally available on the market and the like may be used.

Next, the construction of the control system in the present embodiment will be described in accordance with the block diagrams of FIGS. 1 and 2 wherein the light beam 2E emitted from the beam source 2 is scanned in a rotating direction of the rotating table 4 and the light beam 2E is reflected by one of the reflectors 6a-6d. The light beam 2R reflected by the one of the reflectors 6a-6d is introduced into the beam receiver 3. A rpm of the rotating table 4 is controlled by a motor control means 5a.

In a counter 9, the number of pulses output from the rotary encoder 7 is counted in accordance with rotation of the rotating table 4. The count value of the pulses is transferred to a discrimination processing means 11 in every reception of the reflected light beam in the beam receiver 3. Light emitting signals from the beam source 2 and light receiving signals from the beam receiver 3 are inputted, too. In the discrimination processing means 11, an azimuth of each reflector 6 with respect to the advance direction of the moving vehicle 1 is calculated on the basis of the count value of the pulses transferred in every reception of the reflected light beam.

Actual azimuthes detected by the discrimination processing means 11 and a presumed azimuth in case where a reference point is missed (the details of such presumed azimuth will be described hereinbelow) are inputted to either a diagonal differential azimuth operating means 37 and a first position-advance direction operating means (herein-after referred to simply as "first operating means") 34 or an adjoining differential azimuth operating means 10 and a second position-advance direction operating means (hereinafter referred to simply as "second operating means") 13 through a switching means 36.

The switching means 36 is switched in response to the presence of a reference point-missing signal "d" output from the discrimination processing means 11. In FIG. 1, such a situation in which the reference point lost signal "d" is output, and as a result the switching means 36 is switched to the side of the adjoin-ing differential azimuth operating means 10 as well as the second operating means 13 is illustrated.

In the diagonal differential azimuth operating means 37, differential azimuthes defined between each pair of the reflectors 6 disposed at diagonal positions, respectively, among the reflectors 6 placed at four positions viewed from the moving vehicle 1 are operated. In the first operating means 34, the coordinates of a current position of the moving vehicle 1 are calculated according to a formula disclosed in U.S. Pat. Ser. No. 413,935, on the basis of the above described differential azimuthes and at the same time, the advance direction of the moving vehicle 1 is calculated on the basis of the azimuthes of the four reflectors 6.

Furthermore, differential azimuthes defined between two reflectors 6 adjoining with each other among the three reflectors out of four are operated in the adjoining differential azimuth operating means 10. In the second operating means 13, coordinates of a current position of the moving vehicle 1 are calculated according to a formula disclosed in U.S. Ser. Nos. 344,574 or 362,630, on the basis of the above differ-ential azimuthes and the advance direction of the moving vehicle 1 is simultaneously calculated based on the azimuthes defined by the three reflectors 6 out of four.

The three reflectors 6 mentioned above mean the three reflectors 6 other than the single reflector 6 disposed at the reference point missed.

The results of the operations in the first operation means 34 and the second operation means 13 are inputted to a comparing means 25. In the comparing means 25, data indicating a traveling course set in a traveling course setting means 16 are compared with the coordinates and the advance direction of the moving vehicle 1 obtained in the first operation means 34 or the second operating means is to calculate the difference between them.

The difference is supplied to steering means 14, a steering angle is decided based on the difference, and a steering motor (M) 35 connected to front wheels 17 of the moving vehicle is driven on the basis of the above-mentioned steering angle. The steering angle for the front wheels 17 driven by the steering motor 35 is detected by means of a steering angle sensor 15 mounted on the front wheels of the moving vehicle 1, and fed back to the steering means 14.

A driving means 18 controls starting and stopping of an engine 19 as well as operation of a clutch 20 for transmitting the power of the engine 19 to rear wheels 21.

The discrimination processing means 11 outputs a fail signal "e" to stop the traveling of the moving vehicle 1 when missing of a particular reference point consecutively occurs more than predetermined times, or when reference points of more than a predetermined number are consecutively lost. The fail signal "e" comprises two signals "e1" and "e2" which are described later. Incidentally, the structural elements shown in FIG. 1, the portion surrounded by a chain line may be constructed by a microcomputer.

Now, the detailed construction of the discrimination processing means 11 will be described hereinbelow with reference to FIG. 2. In the discrimination processing means 11, the azimuth of each reflectors 6, and the distances between the light beam receiver 3 and the sources of the lights incident upon the light beam receiver 3, in other words, the distances between the moving vehicle 1 and the reflectors 6 and the distance between the moving vehicle 1 and other reflecting objects are detected. And based on the azimuthes and the distances, the discrimination processing and missing processing of the light reflectors 6 are performed. Also, the means 11 outputs a command signal to stop or slow down the moving vehicle 1, and another command signal to reduce the number of revolutions of the rotating table 4, when the distances are being measured.

Figure 2:
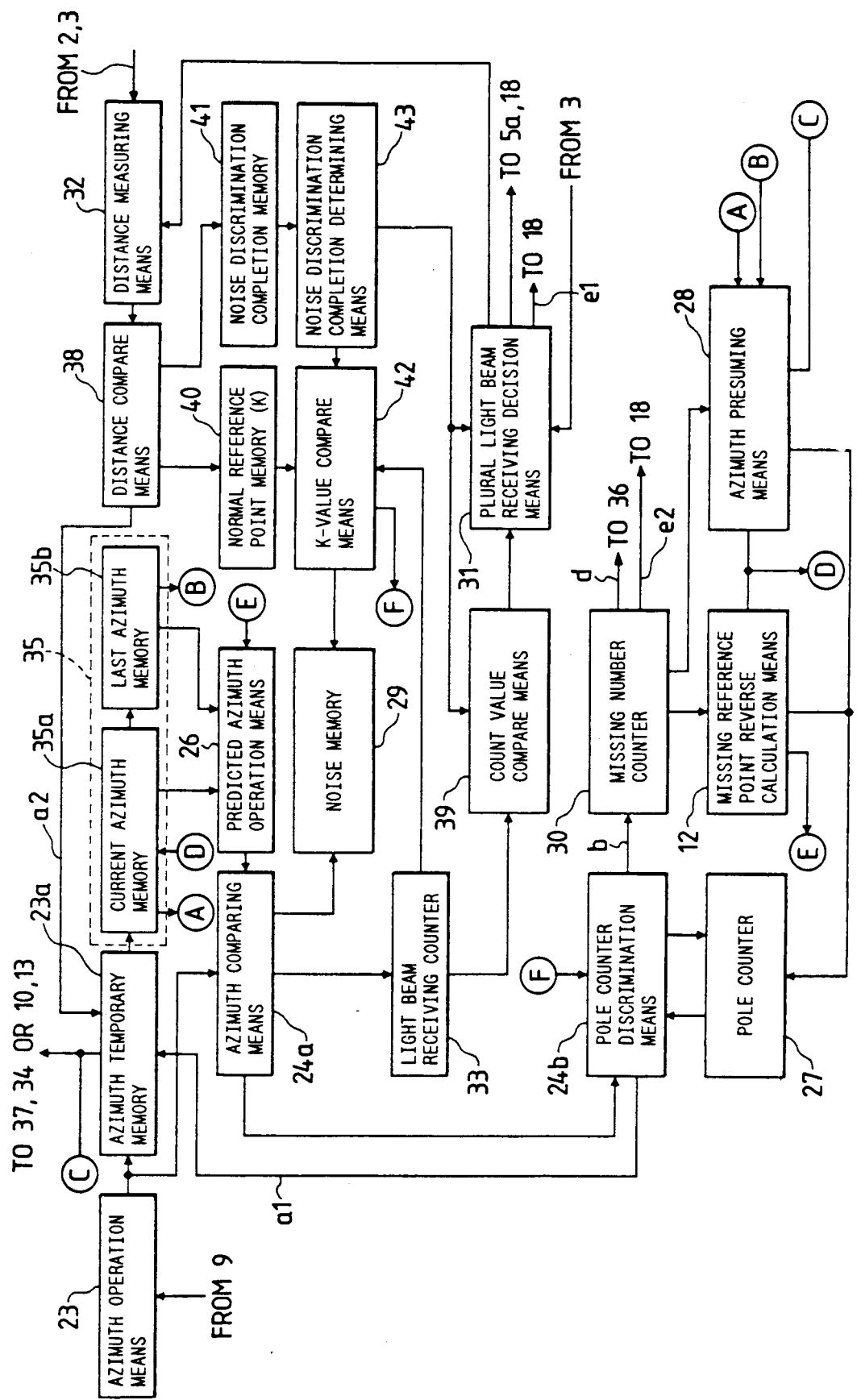
FIG. 2 is a detailed block diagram showing a discrimination processing means of FIG. 1.

In FIG. 2, the azimuth of each reflector 6 in regard to the advance direction of the moving vehicle 1 is operated on the basis of the pulse count value input from the counter 9 in the azimuth operation means 23. Thus calculated azimuthes are stored in the memory for temporarily storing azimuth 23a, and then they are stored in memory means for storing the current azimuth 35a after the azimuth determination processing which is described later. Data stored in the memory for current azimuth 35a are transferred to and stored in the memory for storing the last azimuth 35b when data in the memory for current azimuth 35a is renewed with latest data.

In the memory for current azimuth 35a and the memory for last azimuth 35b, the azimuthes θa, θb, θc and θd of the reflectors 6a-6d placed at the later described reference points A, B, C and D, respectively, can be stored.

On the basis of the azimuthes stored in the memory for current azimuth 35a and the memory for last azimuth 35b, the predicted value of the azimuth at which a particular reflector 6 is to be detected in the next scan, namely, the predicted azimuth is operated according to the later described flowchart (FIG. 6) in the predicted azimuth operation means 26. The predicted azimuth has a predetermined allowance range.

To the azimuth comparing means 24a, the actual azimuth which has been calculated in the azimuth operation means 23 based on the latest received beam signal, and the predicted azimuth calculated in the predicted azimuth operation means 26 are input and a determination is made as to whether the latest received beam signal is in the allowance range of predicted azimuth.

If the actual azimuth based on the latest received beam signal is within the allowance range of predicted azimuth, the value in the pole counter 27 is discriminated in the pole counter discrimination means 24b.

In the pole counter 27, its count value is renewed to the count value corresponding to each of the respective reflectors 6 each time each of reflectors 6a-6d arranged at the reference points A, B, C and D is detected. For instance, a value "1" is set in the pole counter 27 if it is determined that the reference point A is detected, and a value "2" is set if it is determined that the reference point B is detected, and so forth, whereby the reference points are made to correspond to the values in the pole counter 27.

The value of the pole counter 27 is input to the pole counter discrimination means 24b where it is compared with predetermined numerical value which is set therein. Based on the result of the discrimination in the pole counter discrimination means 24b, a determination is made as to whether the signal detected in the light beam receiver 3 is one of the light reflected from an expected reflector 6.

If it is determined that the detected signal in the light beam receiver 3 is one from some other reflector 6 than the expected one, a signal "b" is output from the pole counter discrimination means 24b deeming that the expected reflector 6 has been lost, and the count value in a missing number counter 30 is incremented. The missing number counter 30 has a first counter which is incremented when a particular expected reflector 6 is lost, and a second counter which is incremented when two expected reflectors 6 are consecutively lost.

If the beam signal is detected outside the range of predicted azimuth, it is determined to be a noise, and the position of the moving vehicle and the azimuth of the noise source viewed from the moving vehicle 1 at a moment when the noise is received are stored in a noise memory 29.

If a plurality of beam signals are detected in a single predicted azimuth range, beam receiving number of times is counted by a light beam receiving counter 33. If it is determined that a plurality of beam signals have been detected in a count value compare means 39, based on the count value in the light beam receiving counter 33, a determination is made in a plural light beam receiving decision means 31 as to whether the detection of plural beam signal is due to the fact that the light beam receiver 3 has lost all of the intermediate reference points, and as a result, has re-detected the light from the same light source in the same predicted azimuth range after one revolution, or due to the fact that it has received the light from another light source in the same predicted azimuth range in the same scan immediately after the last detection of beam signal. The plural light beam receiving decision means 31 may be comprises of a means for measuring the elapsed time, for instance, from the last beam signal detection to the current beam signal detection.

If it is determined in the plural light beam receiving decision means 31, that the light beam receiver 3 has redetected the light from the same light source after one revolution, that is, if consecutive three reference points has been missed, a fail signal "e1" is output to the driving means 18 thereby to stop the moving vehicle 1.

On the other hand, if it is determined that a plurality of lights has been detected within a single predicted azimuth range in a particular scan before the light beam receiver 3 made one revolution in the plural light beam receiving decision means 31, the distance between each of the sources of the plurality of incident lights and the moving vehicle 1 is measured in a distance measuring means Prior to the distance measurement, signal for reducing the rotational speed of the rotating table 4 is output to the driving means 18 and if necessary, another signal for stopping or slowing down the moving vehicle 1 is output to the motor control means 5a, in order to facilitate the distance measurement and increase the precision thereof. The distance measuring means 32 may be any of the conventional distance measuring means which measure distance on the basis of difference between the phase of the light beam emitted from the light beam source 2 and the phase of the reflected light returning to the light beam receiver 3. The plurality of distance data detected in the distance measuring means 32 are compared with each other in a distance compare means 38. Based on the result of the comparison in the distance compare means 38, the one closest to the moving vehicle among the plurality of light sources is determined to be the expected reference point, and said one light source is assigned with a value "K" which is stored in a normal reference point memory 40.

If it is determined that the reflected light from the reflector 6 placed at an expected reference point in the distance compare means 38 or the pole counter discrimination means 24b, a discrimination signal "a1" or "a2" is output, and the azimuth stored in the memory for temporarily storing azimuth 23a is input through a switching means 36 to either the diagonal differential azimuth operating means 37 and the first operating means 34 or the adjoining differential azimuth operating means 10 and the second operating means 13. At the same time, the contents in the memory for the current azimuth 35a are renewed with the definite azimuth, and the contents in the memory for the last azimuth 35b are renewed with the azimuth stored in the memory for the current azimuth 35a. If the one missing number of times of a particular reference point and the consecutive-missing number of times of reference points which are counted in the missing number counter 30 are not greater than the respective threshold values T1 and T2, the azimuth of the missing reflector 6 is presumed in an azimuth presuming means 28, on the basis of the current azimuth and the last azimuth stored in the azimuth storing means 35a and 35b. The current azimuth in the azimuth storing means 35 is renewed with the presumed azimuth, and the last azimuth is renewed with the current azimuth. The presumed azimuth is input to the first operating means 34, the second operating means 13, the adjoining differential azimuth operating means 10 and the diagonal differential azimuth operating means 37.

If the one-missing number of times of a reference point exceeds the threshold value T1, the azimuth of the missing reflector 6 is calculated in a missing reference point reverse calculation means 12, on the basis of the current azimuthes of the reflectors 6 at three places except the missing reflector 6, which are stored in the memory for the current azimuth 35a. The calculated azimuth is stored in the memory for the current azimuth 35a as the current azimuth of the missing reflector 6 and also input to the predicted azimuth operation means 26, and based on said azimuth, the predictive azimuth of the missing reflector 6 to be detected in the next scan is calculated.

Figure 1:
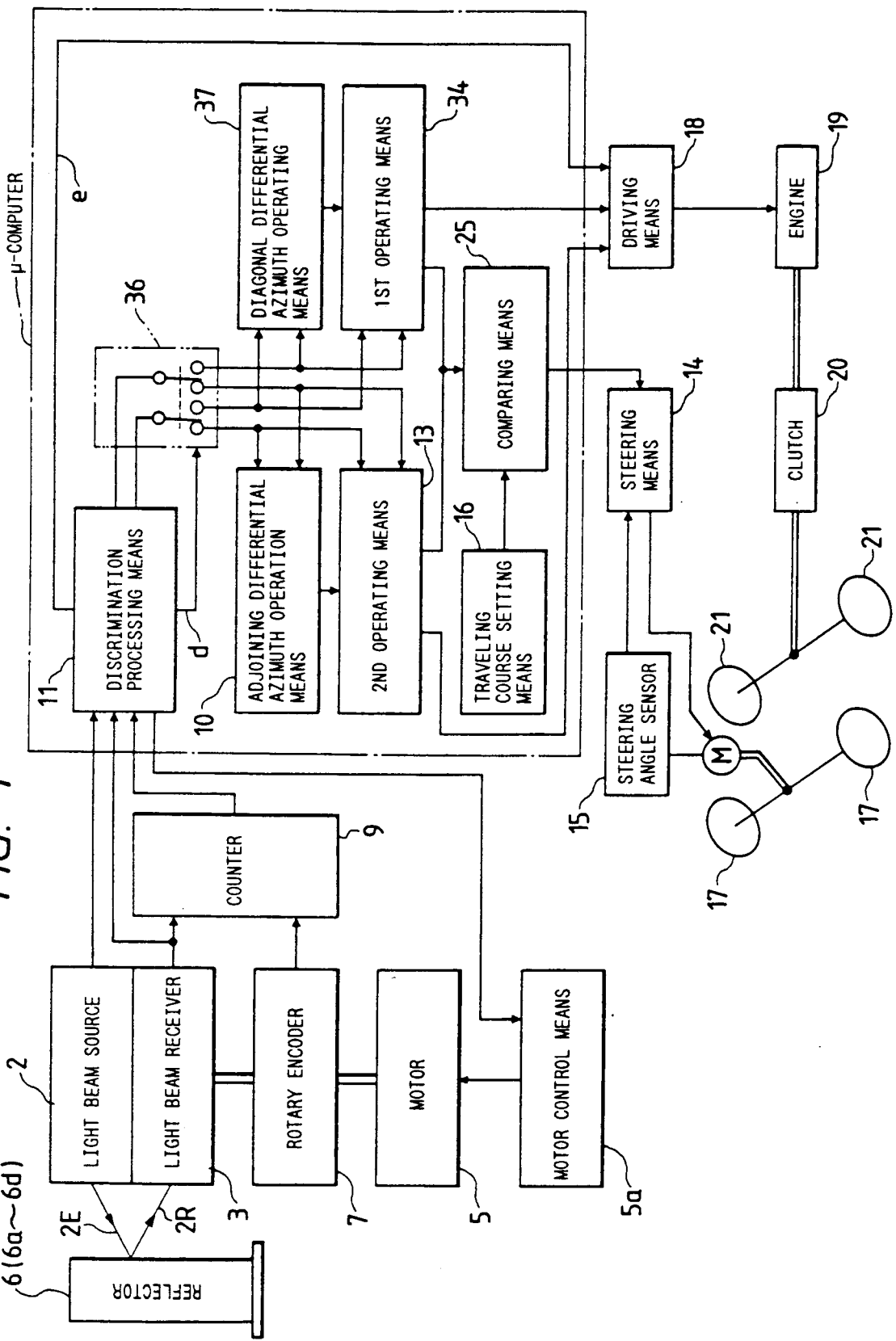
FIG. 1 is a block diagram showing an embodiment of the present invention.

If the one-missing number of times of a reference point exceeds the threshold value T1, a signal "d" is output from the missing number counter 30 to the switching means 36, whereby the switching means 36 is changed over to the state as shown in FIG. 1.

On one hand, when plural missing number of times exceed the threshold value T2, a signal "e2" is output to the driving means 18 to stop travel of the moving vehicle 1.

Since missing of two reference points is more seriously affected than missing of one reference point as to precision in positional detection of the moving vehicle 1, less number of times than that of the threshold value T1 is set as the threshold value T2. If two adjoining reference points are missed, the moving vehicle 1 is stopped at once at the time when the plural missing number of times exceeds the threshold value T2.

On the other hand, in case of missing one reference point, the position and the advance direction of the moving vehicle 1 are operated on the basis of positions and azimuthes of the reflectors 6 disposed at three reference points except the missing reference point when the missing number of times exceeds the threshold value T1.

The counted values in the missing number counter 30 and the light beam receiving counter 33 are cleared when it is judged in the pole counter discrimination means 24b and the distance compare means 38 that the light reflected from the expected reflector 6 has been received.

The value of the pole counter 27 is renewed when it is determined in the pole counter discrimination means 24b and the distance compare means 38 that the expected reflector 6 has been correctly detected, or when the azimuth has been calculated in the missing reference point reverse operation means 12 and/or the azimuth presuming means 28, that is, the missing processing has been finished.

When it is detected in the distance compare means 38 that any of the beam signals received is one derived from the light reflected by the expected reference point, data are stored in a noise discrimination completion storing means 41, which data indicate that a plurality of light signals have been detected in the single predicted azimuth range, and the discrimination is completed as to which of the signals is a noise and which is a normal signal. The K-value and the counted value in the light beam receiving counter 33 are compared in a K-value compare means 42, and it is determined whether or not the noise discrimination is completed in the noise discrimination completion determining means 43. In order to prevent the noise discrimination processing from being repeated, the comparison of the count of the light beam receiving counter 33 and the judgment in the plural light beam receiving determination means 31 are performed on the basis of the determination result in the noise discrimination completion determining means 43 in the next scan and thereafter. According to the result of the determinations in the noise discrimination completion determining means 43 and the K-value compare means 42, the pole counter is discriminated.

Now, the operation of the present embodiment will be described.

Figure 8:
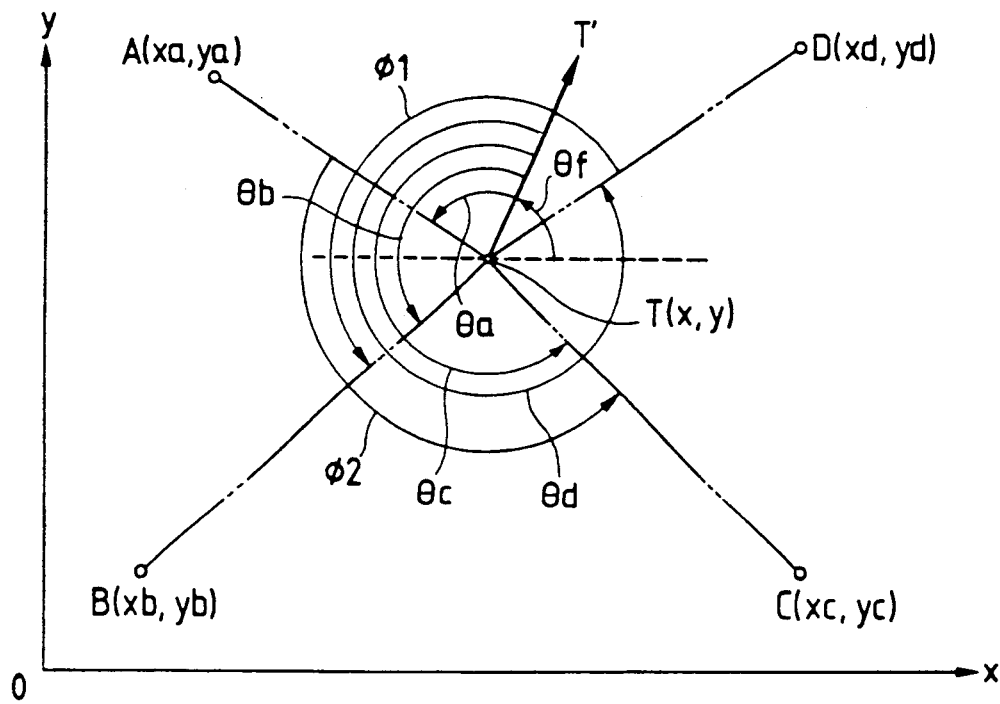
FIGS. 8 and 9 are explanatory graphical representation, respectively, for showing the relationship between the advance direction of the moving vehicle and azimuthes of the reference points and differential azimuthes.
Figure 9:
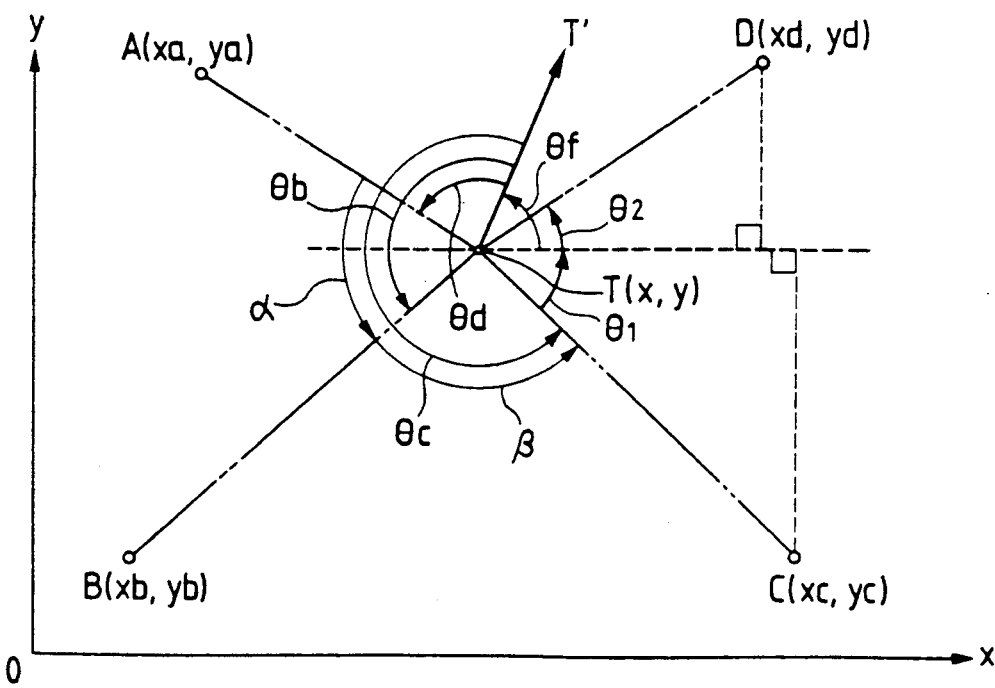

FIGS. 8 and 9 are explanatory graphical representations each showing the position T of the moving vehicle 1 and that of the reflector 6 in a coordinate system for indicating a working area of the moving vehicle 1.

In FIGS. 8 and 9, disposed positions of the reflectors 6a-6d are indicated by reference points A-D, and the positions of the reference points are represented by an x-y coordinate system. The current position of the moving vehicle 1 is T(x, y) and advance direction with respect to the x-axis is θf.

In FIG. 8, azimuthes of the reference points A, B, C and D with respect to the advance direction of the moving vehicle 1 are designated by θa, θb, θc and θd, respectively, and differential azimuthes defined between reference points positioned at the respective diagonal positions are designated by φ1 and φ2, respectively.

FIG. 9 shows relationships between the remaining three reference points A, B and C in case of missing one reference point (reference point D in the same figure) and the moving vehicle 1, respectively, in which reference characters θa, θb and θc denote the azimuthes of the respective reference points A, B and C with respect to the advance direction of the moving vehicle 1, and α and β denote differential azimuthes defined between adjoining reference points A and B as well as B and C, respectively. θ1 is an angle between the x-axis and the line connecting the points T and C, whilst θ2 is an angle between the x-axis and the line connecting the points T and D which represent the missing reference point.

A formula for calculating a position T (x, y) and an advance direction θf of the moving vehicle 1 based on the above described azimuthes θa, θb, θc and θd as well as the differential azimuthes φ1 and φ2 is stored in the first operating means 34, whilst another formula for calculating a position T (x, y) and an advance direction θf of the moving vehicle 1 based on the above described azimuthes θa, θb and θc as well as the differential azimuthes α and β is stored in the second operating means 13. An example of the formula to be stored in the first operating mean 34 and that of the second operating means 13 are described in detail in U.S. Ser. No. 413,935 as well as U.S. Ser. Nos. 344,574 and 362,630, respectively.

Figure 10:
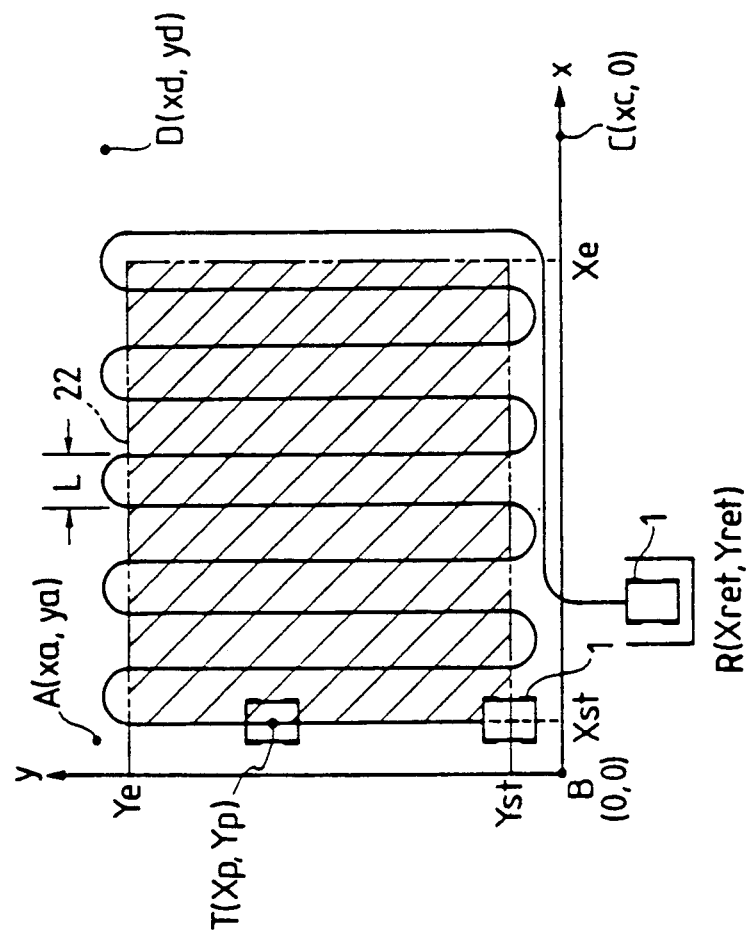
FIG. 10 is a graphical representation showing a situation of arrangement of a traveling course of a moving vehicle and reflectors.

Next, steering control for the moving vehicle 1 based on the positional information of the moving vehicle 1 calculated in accordance with the above procedure will be described hereinbelow. FIG. 10 is a schematic diagram showing a traveling course of the moving vehicle 1 and the coordinates of the reflectors 6, and FIG. 3 is a flowchart illustrating a procedure for steering control.

In FIG. 10, points A, B, C and D indicate positions at which the reflectors 6a-6d are disposed, and the current position T and the working area 22 of the moving vehicle 1 are represented by such a coordinate system wherein the point B is fixed as the origin, and a straight line extending between the points B and C is defined as x-axis. (Xret, Yret) indicate coordinates of a returning position R of the moving vehicle 1, and the working area 22 is a quadrilateral region including four apexes of the points represented by four coordinates (Xst, Yst), (Xst, Ye), (Xe, Yst) and (Xe, Ye). In this case, the current position of the moving vehicle 1 is represented by T(Xp, Yp).

For the simple explanation, while such an example wherein four sides of the working area 22 are parallel to x- or y-axes is shown in FIG. 10, other directions and/or shapes of the working area may be selected so far as the points A-D are disposed around the working area 22.

In accordance with the flowchart shown in FIG. 3, a control procedure will be described hereinbelow in which it is assumed that the moving vehicle 1 reciprocates in parallel to y-axis as in the traveling locus of FIG. 10, and the pitch therefor is L.

First of all, in step S1, the moving vehicle 1 is transferred by means of, for example, radio control from a point R to a position where working is to be started.

In step S2, the beam emitter 2 and the beam receiver 3 are rotated while stopping the moving vehicle 1 to detect the respective reference points A, B, C and D, and at the same time azimuthes of the respective reference points viewed from the moving vehicle 1 are detected and stored in the current azimuth storing means 85a.

In step S3, Xst is set as an X-coordinate Xn for a traveling course thereby to fix the traveling course.

Traveling of the moving vehicle 1 is started in step S4.

It is judged in step S5 whether or not reflected light from any reference point is received by the beam receiver 3. The step 5 is repeated until the reflected light is detected. When detected the reflected light, the operation proceeds to step S6, and a subroutine process for discriminating reference points which will be described hereinafter is carried out.

In step S7, a determination is made as to whether or not any particular reference point of the four reference points has been consecutively missed over a predetermined number of times (threshold value T1) depending on the existence of the reference point missing signal "d" output from the missing number counter 30.

If the judgment in the step S7 is "NO", i.e., in the case where it is judged that any one reference point among the reference points disposed at four positions has not been successively missed over a predetermined number of times, e the procedure proceeds to step S8 where the position and the advance direction of the moving vehicle 1 are operated on the basis of the four reference points in the first operating means 34.

If the judgment in the step S7 is "YES", i.e., in the case where it is judged that particular one reference point among the reference points disposed at four positions has been successively missed over a predetermined number of times, the procedure proceeds to step S9 where the position and the advance direction of the moving vehicle 1 are operated on the basis of the remaining three reference points in the second operating means 13.

In step S10, the azimuth of the reference point which has been consecutively missed over a predetermined number of times is reversely calculated on the basis of the azimuthes of the three reference points except the missing reference point. The calculation formula for the reverse calculation will be described later.

In step S11, a deviation amount of the traveling course ($\Delta X = Xp - Xn$, $\Delta \theta f$) is operated, and a steering angle is controlled in step S12 by the steering means 14 in response to the amount of deviation calculated.

In step S13, it is judged that either the moving vehicle 1 travels towards the direction going away from the origin (forward direction) or the direction approaching the origin (reverse direction) in the y-axial direction.

In case of forward direction, it is judged whether one stroke has been finished (Yp>Ye) or not in step S14, whilst in case of reverse direction, it is judged whether one stroke has been finished (Yp<Yst) or not in step S15. When it is judged that such one stroke has not been finished in either step S14 or step S15, processings in steps S5-S13 are repeated.

In case where it is judged that such one stroke has been finished in either step S14 or S15, it is judged in the following step S16 whether the whole strokes has been finished (Xp>Xe) or not.

When has not been finished the whole strokes, the procedure shifts from step S16 to step S17 to effect U-turn control of the moving vehicle 1. U-turn control is carried out in accordance with a different method from the one for steering control in a straight traveling course which is effected according to processing steps S11 and S12 wherein the positional information of the moving vehicle 1 operated by the first or the second operating means 34 or 13 is fed back to the steering means 14.

An example of the U-turn control system is detailed in USP. Ser. No. 362,630. In brief, in the turn course, the steering angle of the moving vehicle 1 is fixed at a preset angle while the moving vehicle 1 travels and it is deemed that the turn course has terminated, returning to the steering control for the go-straight course when at least one of the azimuthes of the respective reference points A, B, C and D falls in the predetermined angle range.

In step S18, a pitch L is added to Xn thereby operating (Xn+L) and the following traveling course is set. When set the following traveling course, the procedure returns to step S5 and the above described processings are repeated.

When completed the whole strokes, the moving vehicle returns to the return position R(Xret, Yret) in step S19, and the travel thereof stops in step S20E.

Next, the processing for discriminating reference points in the step S6 will be described hereinbelow.

In the present embodiment, measures for discriminating reference points are constructed in such that the respective reference points A-D are correlated with count values of the pole counter 27, for example, reference points A, B, C and D are allowed to correlate with count value 1, 2, 3 and 4, respectively, whereby the respective reference points are discriminated from one another. More specifically, the pole counter 27 outputs the count values 1, 2, 3 and 4 in that order in every detection of the reflected light 2R by the beam receiver 3 and the reference points can be discriminated by supervising the count values.

For instance, since the reference point to be detected just before detecting the reference point B is A, the count value in the pole counter 27 must be "1" when the light signal form the reference point B is detected, if the reference points have been detected normally. Therefore, if a light signal is detected in the predicted azimuth range for the expected reference point (in this case, point B) when the count value of the pole counter 27 is "1", then it can be determined that the expected reference point has been normally detected.

In these approach, a detection is made as to that the reference point is missed and/or the light reflected by a reflecting object other than the reference point is received by a judgment as to whether or not the reference point and the count value correspond to each other.

Accordingly, in the reference points discrimination processing shown by a flowchart of FIG. 4, it is assumed that only the light detected within a predicted azimuth range is normal reflected light from an expected reference point. Under this assumption, it is judged whether or not the count values output from the pole counter 27 correspond to the reference points, and based on the result of the judgement, it is concluded whether or not the expected reference points have been normally detected after all.

The reference point discrimination processing of the present embodiment includes the noise discrimination processing in which it is discriminated which light is reflected from the expected reference point when a plurality of lights have been detected in the predicted azimuth range. In the noise discrimination processing of the embodiment, when a plurality of lights are detected in the single predicted azimuth range, the distances between the sources of the two incident lights which have been first detected in the azimuth range and the moving vehicle 1 are measured, and the light signal the source of which is closer to the moving vehicle 1 is determined to be the light reflected from the expected reference point and the other signal is determined to be a noise. Only during the distance measurement and the noise discrimination based on the result thereof, the rotational speed of the light beam scanning means which causes the light beam source 2 and the light beam receiver 3 to be rotated, that is, for instance, the number of revolutions of the motor 5 is reduced, and if necessary, the moving vehicle 1 is stopped or the travel speed thereof is slowed down.

When it is determined that a reference point has been missed, or it is determined that a noise has been detected as a result of the above-mentioned determination, the position detection is continued according to the later described reference point missing processing, and if the consecutive missing number of times of the reference point at the particular place exceeds a predetermined number of times, the steering control of the moving vehicle 1 is continued on the basis of the information of reference points at the three places except that missing reference point.

Further, if the consecutive missing number of times of the reference point at the particular place exceeds the predetermined number of times, the azimuth of the missing reference point is obtained by reverse calculation based on the azimuthes of the reference points at the three places except the lost reference point, and the range of the azimuth in which the missing reference point is to be detected in the next scan is presumed based on the azimuth obtained by the reverse calculation.

If the consecutive missing number of times of plural reference points exceeds a predetermined number of times, a fail signal is output to stop the traveling of the moving vehicle 1.

Next, an example of a method for presuming azimuthes of reference points in order to judge that the light detected is the one from an expected reference point will be described hereinbelow in conjunction with the reference point A.

Figure 11:
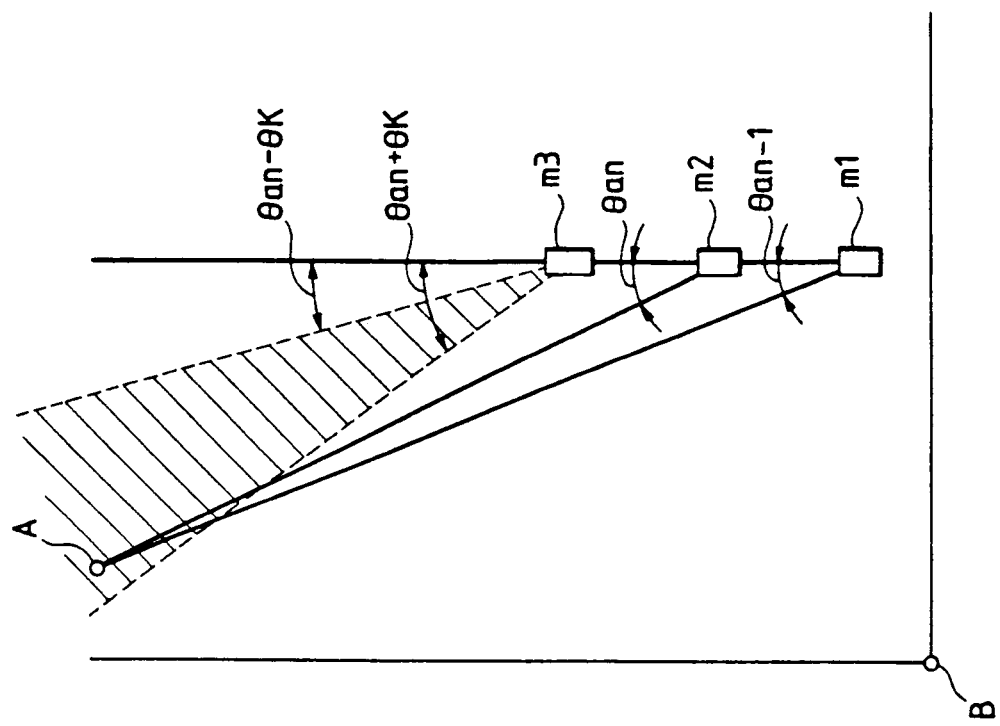
FIG. 11 is an explanatory view for explaining an azimuth of reference point.

FIG. 11 is a diagram showing changes in azimuth of the reference point A viewed from the moving vehicle 1 with the travel thereof therein it is assumed that the azimuth at just previous detection cycle time when the moving vehicle 1 exists at the point m1 is $\theta$an-1, and the azimuth at the current detection cycle time when the moving vehicle 1 exists at the point m2 is $\theta$an. In these circumstances, it is predicted that the azimuth at the next detection cycle time when the moving vehicle 1 is expected to exist at the point m3 is ($\theta$an$\pm\theta$K) where $\theta$K is a fixed value. In this case, the fixed value $\theta$K is determined on the basis of an angle $\{\theta an-(\theta an-1)\}$ which is found experimentally.

According to the experiments by the present inventors, since $\{\theta an-(\theta an-1)\}$ falls within a range of about several degrees except for the case where the moving vehicle 1 is in the turning course, the fixed value $\theta$K is set at 3 degrees in the present embodiment. However, the fixed value $\theta$K is switched to a larger preset value than that in straight travel of the moving vehicle 1, because changes in the azimuth must be abrupt during turning of the moving vehicle 1. In the present embodiment, the fixed value $\theta$K during turning of the moving vehicle 1 is set to 30 degrees. Either OK may be set as such a fixed value which is based on the experiment as mentioned above, or a difference between two azimuthes which were detected at the current and the latest detection cycle times and have been respectively stored in the azimuth storing means 35a and 35b may be set as the value $\theta$K.

The method for predicting the azimuth of the reference point A has been described with refering to FIG. 11, and the azimuthes of the other reference points B-D are similarly predicted.

The processing for discriminating reference points will be explained in accordance with the flowchart shown in FIG. 4 wherein an azimuth of an object, by which light is reflected, with respect to the advance direction of the moving vehicle 1 which has been calculated on the basis of the current beam signal received is read in as $\theta$x in step S61.

In each of steps S62 to S65, a determination is made as to whether or not the detected azimuth $\theta$x exists in the range of the corresponding predicted azimuth at which each of reference points A to D is to be detected. If the decision is positive, the processings for determining the reference points A to D are entered, respectively.

If the detected azimuth $\theta$x does not correspond to any predicted azimuth range, it is determined to be a noise and the process goes to step S66 where the noise warning lamp is temporarily lit, and the coordinates of the moving vehicle 1 and the azimuth of the noise source viewed from the moving vehicle 1 when the noise was detected are read in, and the values thereof are stored in the noise storing means 29.

If the detected azimuth $\theta$x exists in the predicted azimuth range ($\theta$an$\pm\theta$k) for the reference point A, the decision in step S62 becomes positive, and step S67 is entered on the supposition that the received beam signal is one of the light reflected from the reference point A.

In steps S67 to S69, the B- to D-counter processings are carried out, respectively. Details of each counter processing is described later with reference to FIG. 13. In brief, they are processing steps to clear the count values of the B- to D-counters each of which counts the number of light signals detected in the corresponding predicted azimuth range.

Since the beam signal has been detected in the predicted azimuth range ($\theta$an$\pm\theta$k) of the reference point A, in step S70, "1" is added to the count value of the A-counter.

In step S71, it is determined whether or not a noise A discrimination completion flag is "1". Since the noise A discrimination completion flag becomes "1" when a plurality of beam signals are detected in the predicted azimuth range and the noise discrimination on the plurality of beam signals is completed, said flag is "0" at this point of time. Accordingly, the determination in step S71 is negative and the process goes to step S2.

In step S72, it is determined whether or not the A-counter is "2". Since the value of the A-counter in the first processing cycle is "1", the process goes to step S73 from step S72.

In step S73, a determination is made as to whether or not the count value in the pole counter 27 is "4" which corresponds to the reference point D to be detected before the reference point A.

If the count value is "4", the supposition in step S62 that the received beam signal is one of the light reflected from the reference point A is regarded as being correct and step S74 is entered, where the determination processing of the azimuth $\theta$a of the reference point A viewed from the moving vehicle 1 is performed. Details of the determination processing of the azimuth $\theta$a will be described later with reference to FIG. 7.

In step S75, since it is determined that the expected reference point A has been detected, the count value in the pole counter 27 is set to a value "1" which corresponds to the reference point A.

After that, the operation is returned to the step S7 in the main routine (FIG. 3).

On the other hand, if it is judged in the step S73 that the count value in the pole counter 27 is not "4", the operation proceeds to step S76 where it is judged whether or not the count value in the pole counter 27 is "3". If judgment in the step S76 is "YES", it is judged that the reference point D has been lost immediately before, so that the operation proceeds to step S77 where the missing of the reference point D is processed.

Figure 6A:
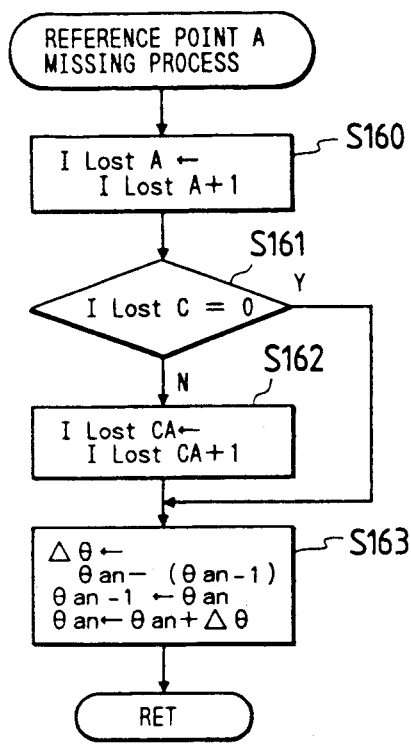
FIGS. 6A-6D is a flowchart showing a processing for reference points lost.
Figure 6B:
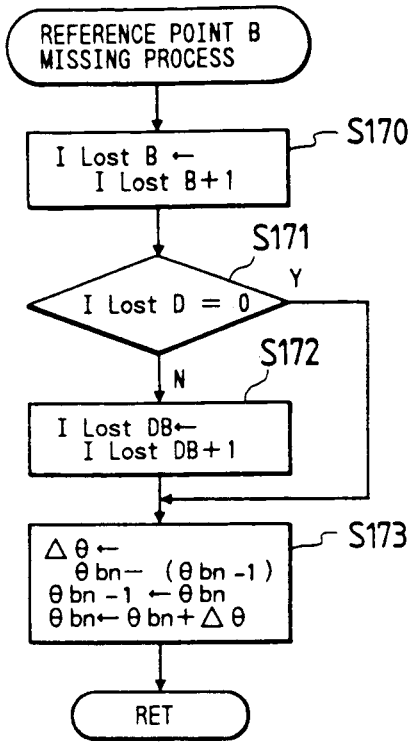
Figure 6C:
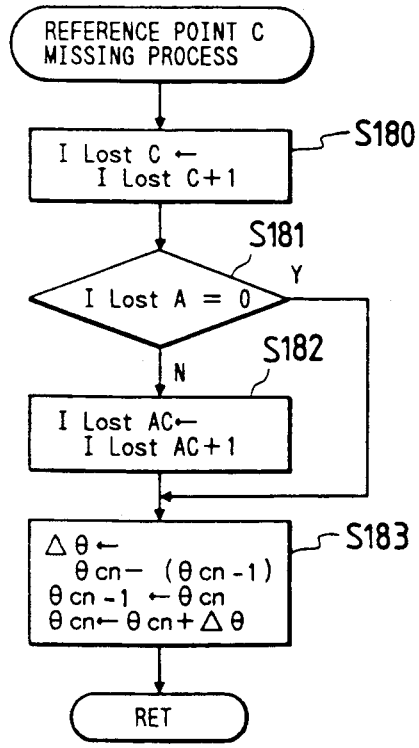
Figure 6D:
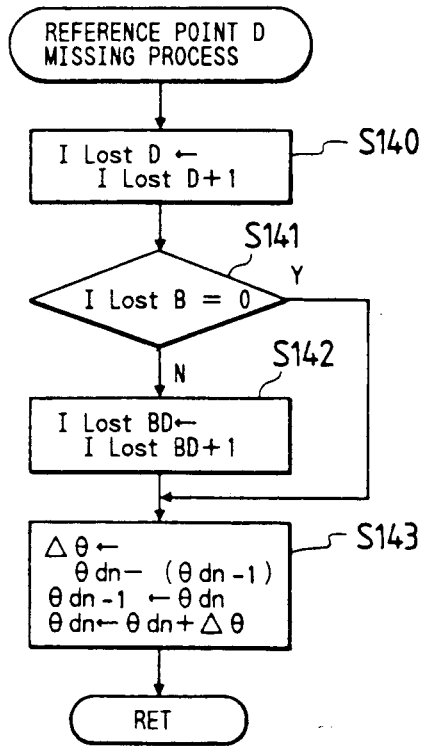

The details of the processing for the missing of the reference point D will be shown in FIG. 6D. After completing the processing for the missing of the reference point D, the operation proceeds to step S78.

In the step S78, it is judged whether or not a missing number of times I LostD for the reference point D exceeds the threshold value thereof T1.

In the judgment in the step S78, when the missing number of times I LostD for the reference point D does not exceed the threshold value T1, the operation proceeds to the step S79 where it is judged whether or not the missing number of times I LostBD which shows that adjoining two reference points B and D have been lost exceeds the threshold value T2. When it does not exceed T2, the operation proceeds to the step S74. When it exceeds the threshold value T2, the operation proceeds to step S135 and the clutch 20 in the moving vehicle 1 is disconnected, the engine 19 is stopped, and a fail lamp is lit continuously or intermittently.

Moreover, in the step S78, when it is judged that the missing number of times for the reference point D, I LostD, has exceeded the threshold value T1, the procedure shifts to step S80 where "1" is set in a reference point D missing flag, and then the procedure proceeds to step S79.

If the value of the pole counter is not "3" in step S76, it is determined that the reference points C and D have been missed, and the process goes to step S81, where the missing processing of the reference point C is executed similarly to the reference point D missing processing.

In step S82, it is judged whether or not the missing number of times for the reference point C, I LostC, exceeds the threshold value T1. In case where the missing number of times I LostC does not exceed the threshold value T1, the procedure proceeds to step S83 to effect a missing processing for the reference point D.

It is judged in step S84 whether the missing number of times for the reference point D, I LostD, exceeds the threshold value T1 or not.

If the missing number of times I LostD does not exceed the threshold value T1, then, the procedure shifts to step S85 where "1" is added to a value of the number of times in missing successively the reference points C and D, i.e. I LostCD, and then the procedure proceeds to step S86 where it is judged whether or not the successively missing number of times for a plurality of reference points C and D, I LostCD, exceeds the threshold value T2. If the missing number of times I LostCD does not exceed the threshold value T2, the procedure proceeds to step S74.

If the missing number of times I LostCD exceeds the threshold value T2, the procedure proceeds to step S135 where the clutch 20 is disconnected, the engine 19 is stopped, and a fail lamp is flashed.

When it is judged in the step S82 that the missing number of times I LostC has exceeded the threshold value T1, the procedure shifts to step S87 where "1" is set in a reference point C missing flag, and then the procedure proceeds to step S83.

Moreover, in the step S84, when it is judged that the missing number of times I LostD has exceeded the threshold value TI, the procedure shifts to step S88 where "1" is set in the reference point D missing flag, and then the procedure proceeds to step S85.

If only one light has been detected in the predicted azimuth range for the reference point A, discrimination step S63 for the reference point B is entered. On the contrary, if a second beam signal has been detected in the predicted azimuth range for the reference point A, the processing is repeated again from step S67.

Since the value of the A-counter becomes "2", if the second beam signal is detected in the predicted azimuth range for the reference point A, the judgment in step S72 is positive and step S89 is entered. Detection of a second beam signal in the predicted azimuth range for reference point A means either that the reference point A has been again detected after missing all of the reference points B to D to be detected after the reference point A. or that a plurality of reflected lights have been detected in this particular predicted azimuth range.

In order to determine which is the case, in step S89, a determination is made as to whether or not the light beam source 2 and the light beam receiver 3 have made almost one revolution after detecting the last light signal. The determination in the step S89 is made in the plural light beam receiving determination means 31. In the present embodiment, it is determined whether or not the light beam source 2 and the light beam receiver 3 have rotated almost one revolution after detection of the last light signal according to whether or not a preset time (e.g. 0.2 sec.) has elapsed since the last light signal was detected.

If it is determined that the light beam source 2 and the light beam receiver 3 have rotated almost one revolution after the last light signal was detected in step S89, it is deemed that the three reference points have been successively missed, and the processing goes to step S135 where the clutch is let out, the engine 19 is stopped, and the fail lamp is lit.

On the other hand, if another light signal has been detected in the same predicted azimuth range during one revolution of the light beam source 2 and the light beam receiver 3 after detection of the last light signal, then in step S90, the traveling of the moving vehicle 1 is stopped or slowed down. However, this step may be omitted and the normal travel speed may be maintained, if it is desirable. In step S91, the scan rotation speed of the light beam source 2 and the light beam receiver 3 is lowered. In step S92, noise discrimination processing is performed. In the noise discrimination processing, it is determined that a reflecting object closer to the moving vehicle 1 is the expected reference point and a reflecting object farther from the moving vehicle is not reference point. This discrimination criterion is based on the practical assumption and experience that, obstacles and the like have been removed before the work inside the work area, that is, in the vicinity of the moving vehicle 1.

Figure 14:
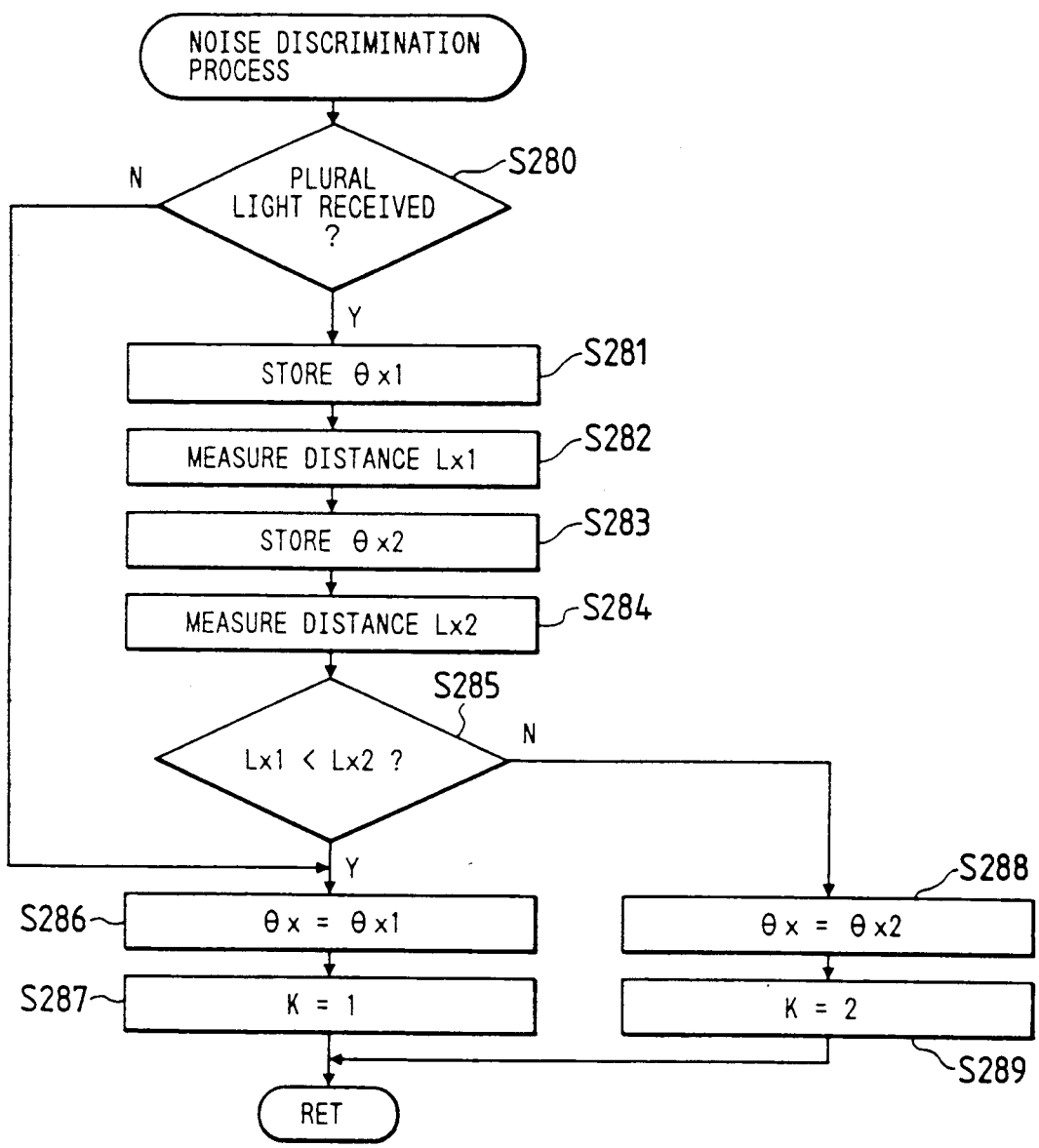
FIG. 14 is a flowchart showing the first method of noise discrimination processing.

The procedure of the noise discrimination processing is shown in the flowchart of FIG. 14. In the noise discrimination processing, the rotating table 4 is rotated at a low speed to scan again the predicted azimuth range of the reference point A with a light beam. If a plurality of incident lights are reconfirmed in the predicted azimuth range, the distances between the sources of the first and second incident lights and the moving vehicle 1 are detected and compared with each other, and the light source closer to the moving vehicle 1 is determined to be the expected reference point.

In step S280, the rotating table 4 is rotated slowly to scan again at least the predicted azimuth range, whereby reconfirmation is made as to whether or not a plurality of light sources are surely existing in the predicted azimuth range.

If the judgment is step S280 is positive, the processing goes to step S281, where the azimuth $\theta x1$ of the light source detected first in the predicted azimuth range is operated and stored in the memory for temporarily storing azimuth 23a.

In step S282, the distance Lx1 between the first detected light source and the moving vehicle 1 is measured and stored.

In step S283, the azimuth $\theta x2$ of the secondly detected light source is operated and stored in the memory for temporarily storing azimuth 23a.

In step S284, the distance Lx2 between the secondly detected light source and the moving vehicle 1 is measured and stored.

In step S285, the distances Lx1 and Lx2 are compared with respect to magnitude. If the distance Lx2 is larger than Lx1, step S286 is entered where θx is renewed with the detected azimuth θx1 detected first in the predicted azimuth range for the reference point A, and in step S287, the K-value for showing which source of the beam signals is closer to the moving vehicle 1 is set to "1".

If, as a result of the comparison in step S285, the distance Lx2 is smaller than the distance Lx1, it is determined that the light source firstly detected is a reflecting object other than the expected reference point and the secondly detected beam signal is from the expected reference point. In step S288, θx is renewed with the detected azimuth θx2 of the secondly received beam signal, and in step S289, the K-value is set to "2".

In the determination in step S280, if it is determined that a plurality of lights have not been detected in the reconfirmation process, steps S281 to S285 are skipped.

When the processing in step S287 or step S289 is finished, the noise discrimination processing is terminated, and in step S93 (FIG. 4), the rotational speed of the light beam source 2 and the light beam receiver 3 is increased, returning to the normal operation speed before the noise discrimination processing.

In step S94, "1" is set in the noise A discrimination completion flag since the noise discrimination processing have been finished. In step S95, the travel speed of the moving vehicle 1 is restored to the normal speed and step S74 is entered, and the processing goes to step S7 (FIG. 3) through step S75. Depending on the determination result in step S7, in either step S8 or step S9, the position and advance direction of the moving vehicle are calculated again on the basis of the latest azimuth θx which has been renewed with θx1 or θx2.

If beam signals more than two have been detected in the same predicted azimuth range, the determination in step S71 as to whether or not the noise A discrimination completion flag is "1", becomes positive and step S96 is entered. In step S96, it is determined whether or not the value of the A-counter is "K", and since "K" has been set at "1" or "2" in the noise discrimination processing, the determination in step S96 becomes negative if the beam signals more than two have been detected, and step S66 is entered where they are treated as noises.

In the processings of step S67 and thereafter in the next scan, the determination in step S96 is positive only when the value of the A-counter is equal to the value of "K" set in the last scan, the step S73 is entered to execute the subsequent processings. If the value of the A-counter is not equal to "k", that is, the beam signal which has been determined to be a noise in the last scan is determined to be a noise at this point of time in the next scan, so the noise discrimination processing can be made efficiently.

If only one beam signal is detected within the predicted azimuth range because the noise sources has been removed, or noise sources, the expected reference point and the moving vehicle lie on a straight line, the noise A discrimination completion flag is set to "0" in the counter processing described later. After that, the processing returns again to the initial condition to perform the discrimination processing.

In steps S63 to S65 in FIG. 4, if it is determined that the beam signals have been detected in the respective predicted azimuth ranges of the reference points B to D, the processings for determining the respective reference points B to D are entered individually.

Figure 4A:
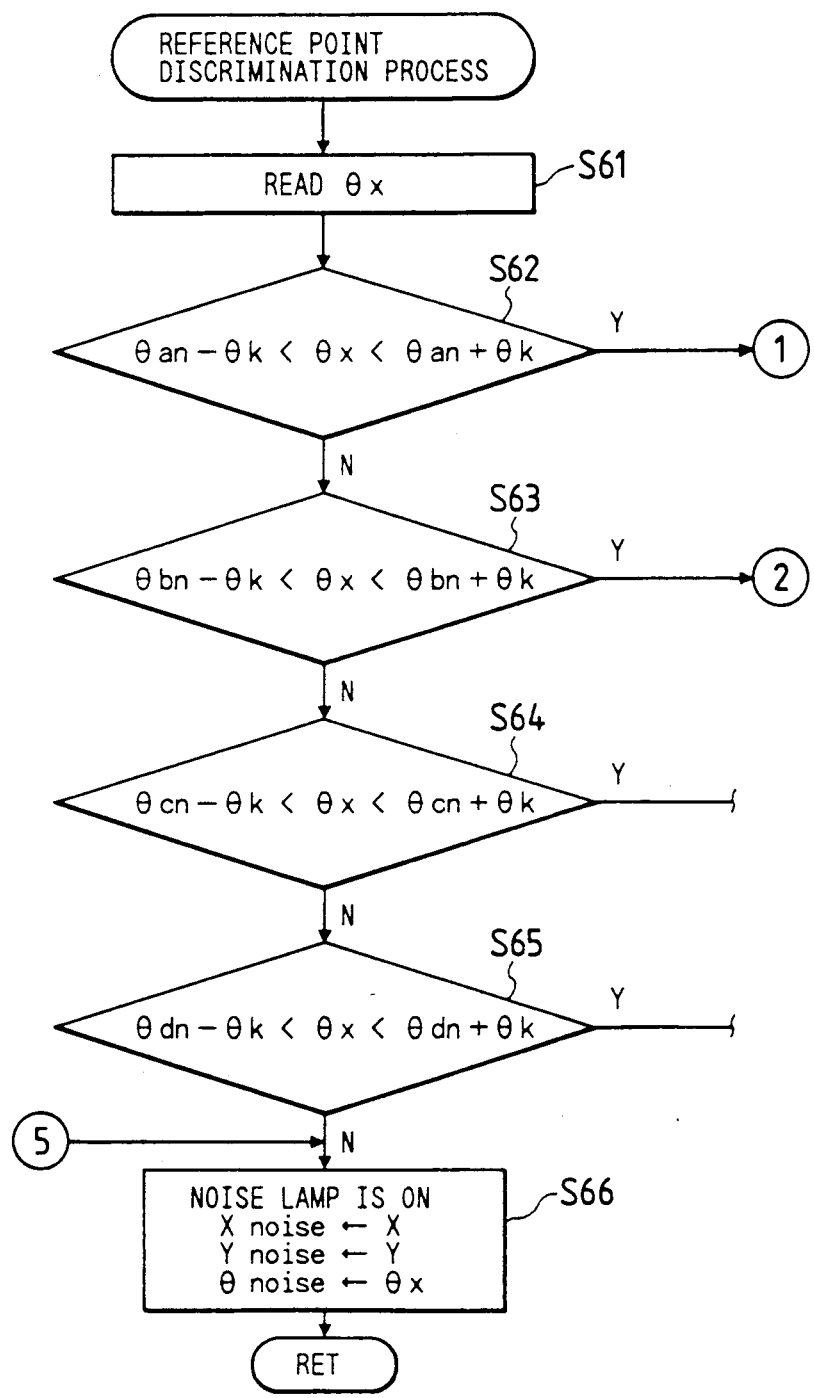
FIGS. 4A-4E is a flowchart showing a processing for discriminating reference points.
Figure 4B:
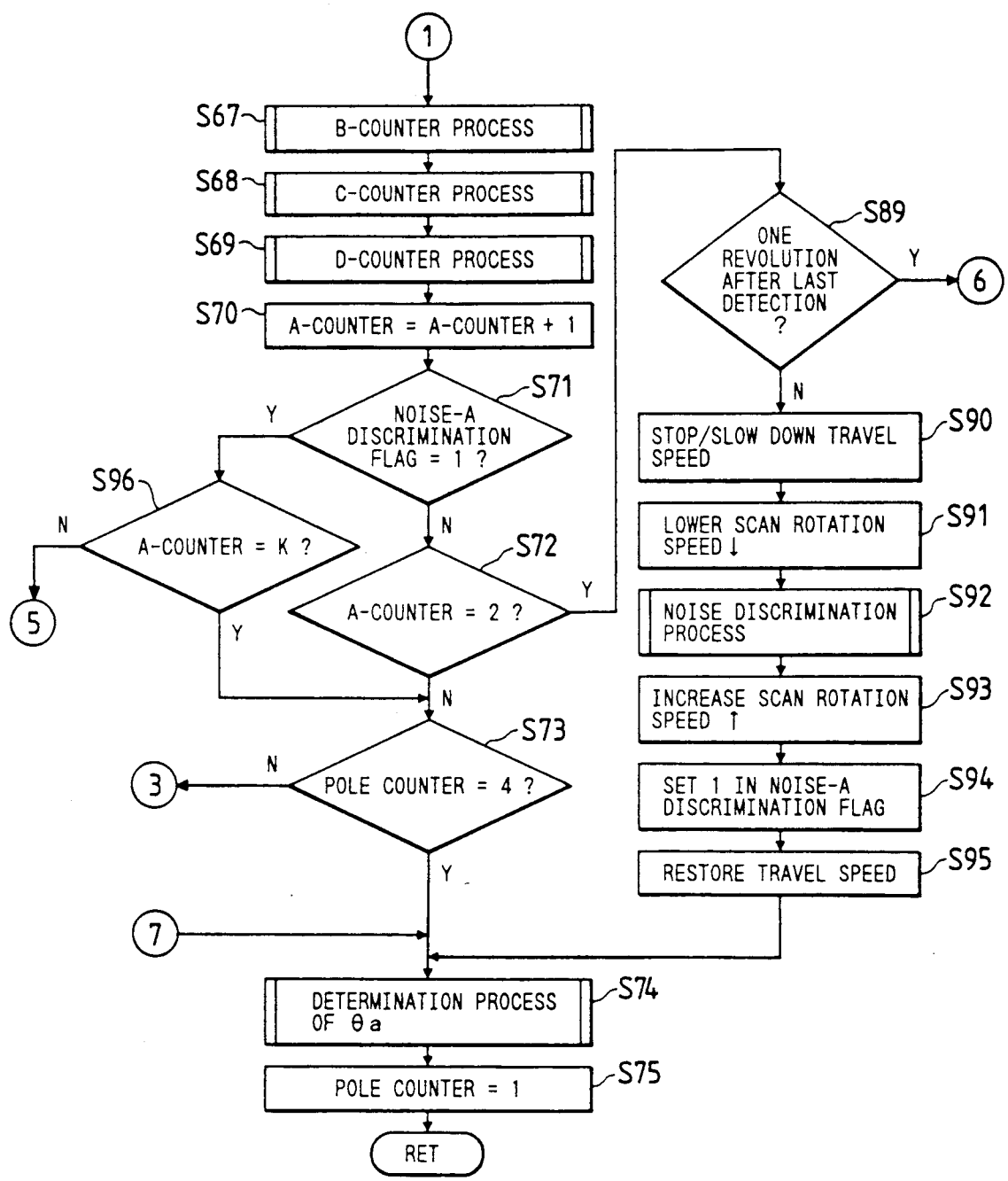
Figure 4C:
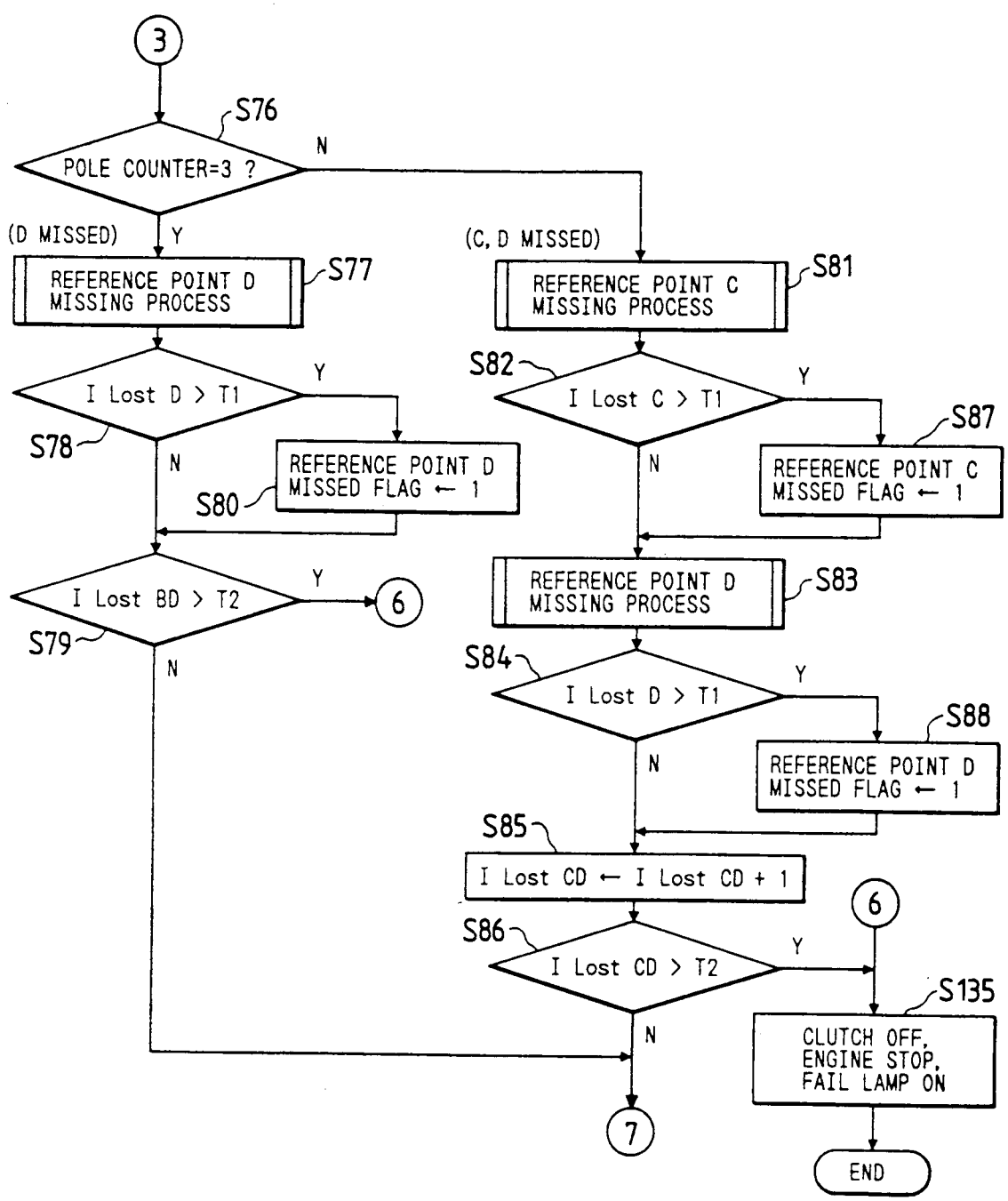
Figure 4D:
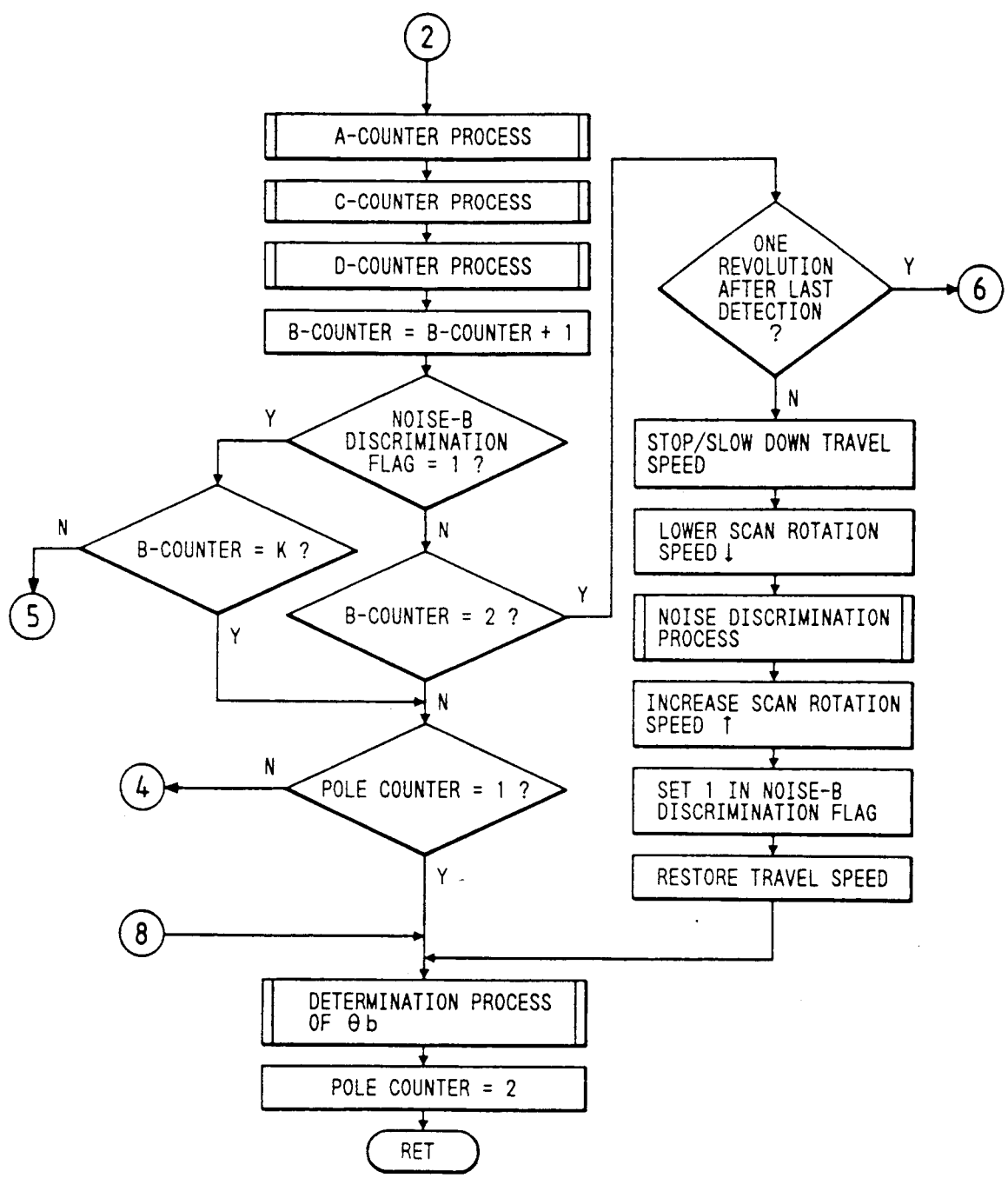
Figure 4E:
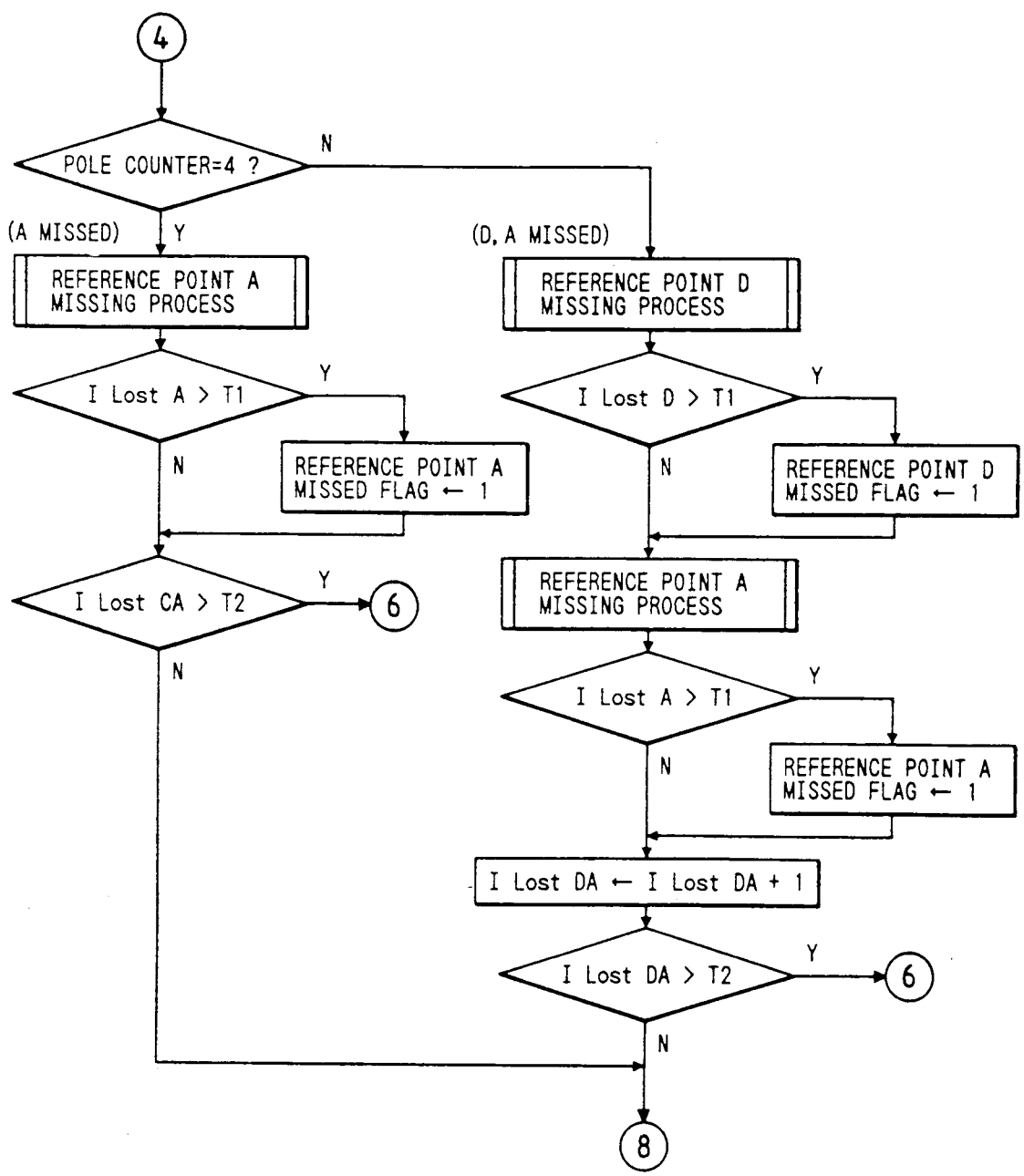

Shown in FIGS. 4D and 4E is the processing for the case that beam signals are detected in the predicted azimuth range (θbn±θK) of the reference point B and the determination in step S63 is positive. It will be easily understood that the processing in each step shown in these figures is executed similarly to the processings of FIG. 4B and FIG. 4C.

The processing subsequent to steps S64 or S65 is similar to the processing shown in FIGS. 4B to 4D when the determination in step S64 or S65 is positive, that is, when the beam signals are detected in the predicted azimuth range for the reference point B or D. It is apparent that it can be implemented similarly only by appropriately changing the symbols A through D.

As shown in the above described flowchart, in the present embodiment, if a plurality of light beam signals are detected in the predicted azimuth range, only two light beam signals detected first are chosen and the one which is closer to the moving vehicle 1 is determined to be the light beam signal of the expected reference point, and the position and advance direction of the moving vehicle 1 are calculated based on the azimuth thereof. When a plurality of light beam signals are detected, the rotational speed of the light beam source 2 and the light beam receiver 3 is reduced and, if it is desirable, the moving vehicle 1 is stopped or slowed down in order to precisely measure the distance between the moving vehicle 1 and the light source.

If the reference points A to D have been missed over the number of times of the threshold value T1, respectively, "1" is set in the missing flag corresponding to each ng reference points A to D. If any reference point missing flag is "1", the switching means 36 is switched to the side shown in FIG. 2, and the position and advance direction of the moving vehicle 1 are calculated on the basis of the positional information, differential azimuthes and azimuthes of the remaining three reference points. And the azimuth of the missing reference point is reversely calculated in the missing reference point reverse calculation means !2.

Now, the method for calculating the azimuth of the missing reference point performed in the missing reference point reverse calculation means 12 is described in detail. FIG. 5 is a flowchart for determining which reference point of the reference points A to D is missing and for calculating the azimuth of the missing reference point.

In step S20, whether or not the missing number of times of the reference point A exceeds the predetermined number of times T1 is determined on the basis of whether or not the reference point A missing flag is "1".

If the missing number of times exceeds the predetermined of times, step S21 is entered where the azimuth θa of the reference point A is reversely calculated on the basis of the known azimuthes of the remaining three reference points except the reference point A, and calculated value is stored in the current azimuth memory 35a.

In step S22, "0" is set in the reference point A missing flag.

If the missing number of times of the reference point A does not exceed the predetermined number of times T1, the processing goes from step S20 to step S23, where it is determined whether or not the missing number of times of the reference point B has exceeded the predetermined number of times Ti on the basis of whether or not the reference point B missing flag is "1".

If the missing number of times has exceeded the predetermined number of times, the processing goes to step S24 where the azimuth θb of the reference point B is reversely calculated on the basis of the known azimuthes of the remaining three reference points except the reference point B.

In step S25, "0" is set in the reference point B missing flag.

If the missing number of times of the reference point B does not exceed the predetermined number of times T1, the processing goes from step S23 to step S26, where it is determined whether or not the missing number of times of the reference point C has exceeded the predetermined number of times T1 on the basis of whether or not the reference point C missing flag is "1".

If the missing number of times has exceeded the predetermined number of times, the processing goes to step S27 where the azimuth θc of the reference point C is reversely calculated on the basis of the known azimuthes of the remaining three reference points except the reference point C.

In step S28, "0" is set in the reference point C missing flag.

If the missing number of times does not exceed the predetermined number times, that is, if any of the reference point missing flags for A to C is not "1", it is determined that the reference point D has been missed over the predetermined number of times, and the azimuth θd of the reference point D is reversely calculated on the basis of the known azimuthes of the remaining three reference points except the reference point D (step S29).

In step S30, "0" is set in the reference point D missing flag.

A equation for reversely calculating the azimuth of the missing reference point D are as follows. The symbols in the following equation are as shown in FIG. 9.

$$\theta 1 = \tan^{-1}\{(Y-Yc)/(Xc-X)\}$$

$$\theta 2 = \tan^{-1}\{(Yd-Y)/(Xd-X)\}$$

$$\theta d = \theta c + \theta 1 + \theta 2 = \theta c + \tan^{-1}\{(Y-RC)/(Xc-X)\} + \tan^{-1}\{(YD-Y)/(XD-X)\}$$

The calculation equations for the missing reference points A, B and C are similar to the above equations.

Now, the reference point missing processing and the determination processing of the azimuthes θa to θd of the reference points viewed from the moving vehicle 1 are described with reference to the flowcharts of FIG. 6 and FIG. 7.

FIG. 6A is a flowchart illustrating the reference point A missing processing in which since it is judged that the reference point A has been missed, "1" is added to the missing number of times for the reference point A, I LostA, in step S160.

In step S161, it is judged whether or not the missing number of times ± or the reference point C, I LostC, is "0", in other words, whether or not the reference point C had been missed. In the case where the reference point C had been missed, the operation shifts to the step S163, whilst when the reference points C had been missed, this means missing of both the reference points C and A so that the procedure proceeds to step S162 to add "1" to the missing number of times for the adjoining reference points C and A, I LostCA.

In step S163, a difference $\{\theta an - (\theta an-1)\}$ between a pair of the azimuthes of the reference point A which have been detected in the last detection cycle and the current detection cycle are read as Δθ, so that the azimuthes θan−1 detected in the before-last detection cycle and θan detected in the last detection cycle are renewed by the θan and (θan+Δθ), respectively. The difference Δθ between the aforesaid azimuthes is not limited to a result obtained by calculating {θan−−(θan−1)}, but a fixed value which has been set previously based on a value found by an experiment may be used as Δθ.

When a particular reference point can not be detected within an expected range, the azimuth data of the particular reference point are presumed and renewed by the missing processing as described above on the basis of the azimuth data in the last and the before-last detection cycles, and then the current position and the advance direction of the moving vehicle 1 are calculated on the basis of the renewed data.

Figure 7A:
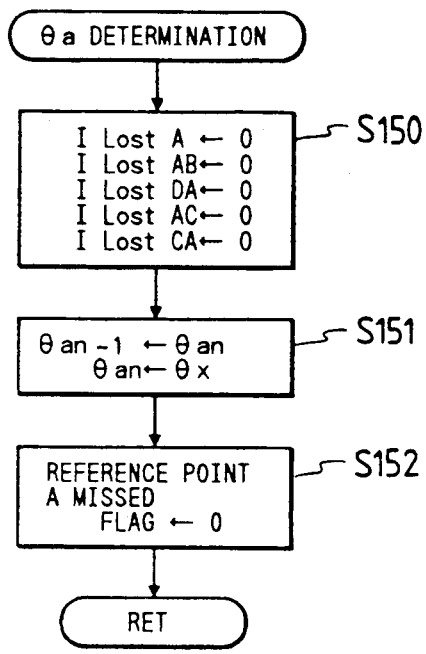
FIGS. 7A-7D is a flowchart showing a processing for determining azimuth.
Figure 7B:
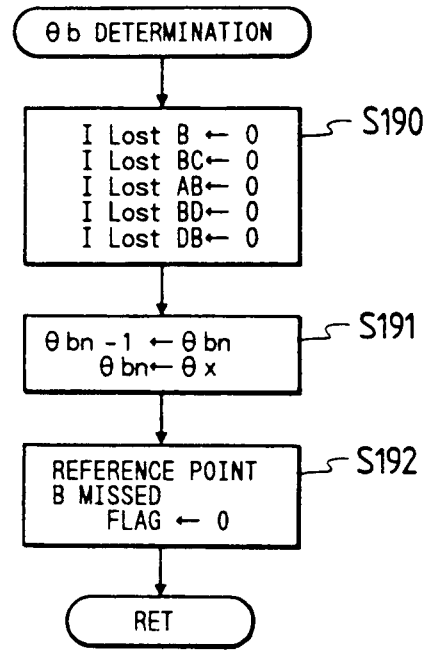
Figure 7C:
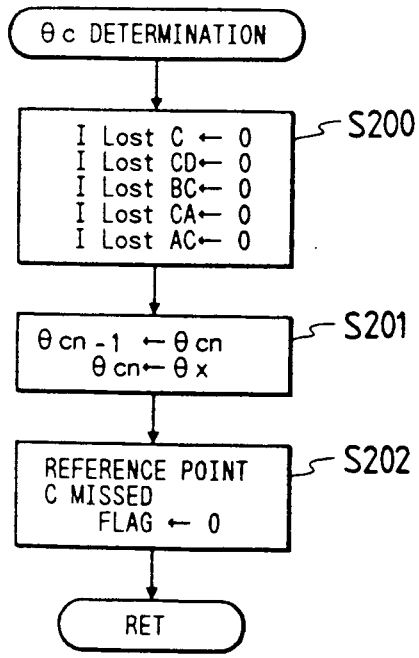
Figure 7D:
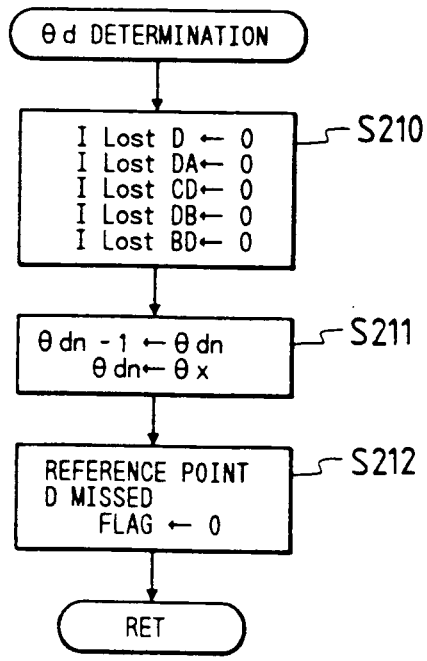

Missing processings for other reference points B, C and D are also similarly effected as for the reference point A, as seen in FIGS. 6B-6D. FIG. 7A is a flowchart showing in detail the step for determination of the azimuth θa of the reference point A.

In step S150, "0" is set as the missing number of times of the reference point A, I LostA, in the missing number of times counter 30, and at the same time. "0's" are set as the numbers of times I LostAB, I LostDA, I LostAC and 1 LostCA in the plural missing number of times counter 31, respectively In step S151, the azimuthes θan detected in the last detection cycle and θx detected in the current detection cycle are read in as θan−1 and θan, respectively, to renew the data.

In step S152 "0" is set as the reference point A missing flag. As a result, the switching means 36 is turn over to the side which is opposite to that shown in FIG. 1, and the position as well as the advance direction of the moving vehicle 1 are operated by the first operating means 34.

The azimuth θa of the reference point A is determined as described above. Processings for determining the azimuthes θb, θc and θd of the reference points B, C and D are shown in FIGS. 6B-6D, respectively. Since the procedures for these processings are the same as that of the processing for determining the azimuth θa of the reference point A, the explanation therefor will be omitted.

Figure 13A:
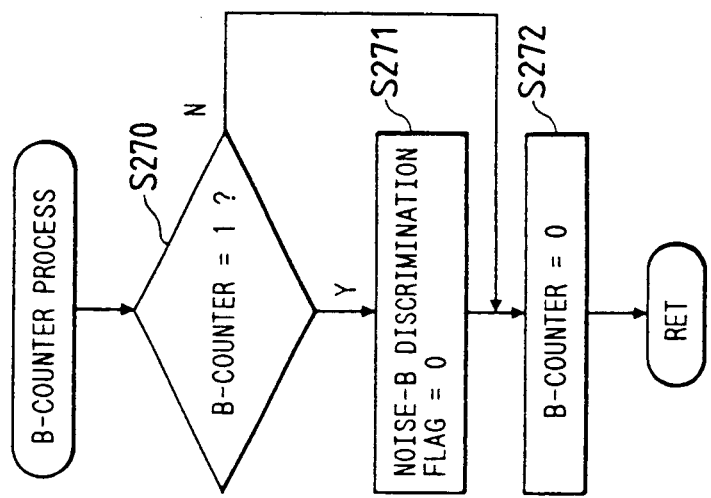
FIGS. 13A and 13B is a flowchart showing counter processing.

Then, the counter processing is described. In FIG. 13A, it is determined whether or not the value of the A-counter is "1" in step S260. Depending on whether or not the A-counter is "1", it is determined whether or not the beam signals more than one were detected in the expected azimuth range in the last scan.

If the value of the A-counter is "1", the processing goes to step S261 where the noise A discrimination completion flag is cleared, and step S262 is entered. In step S262 the A-counter is cleared. After the noise A discrimination completion flag and the A-counter have been cleared, the determinations in steps S71 and S72 of FIG. 4 are negative and the processing for determining the value of the pole counter is executed.

If the determination in step S260 is negative, step S261 is skipped and step S262 is entered.

Figure 13B:
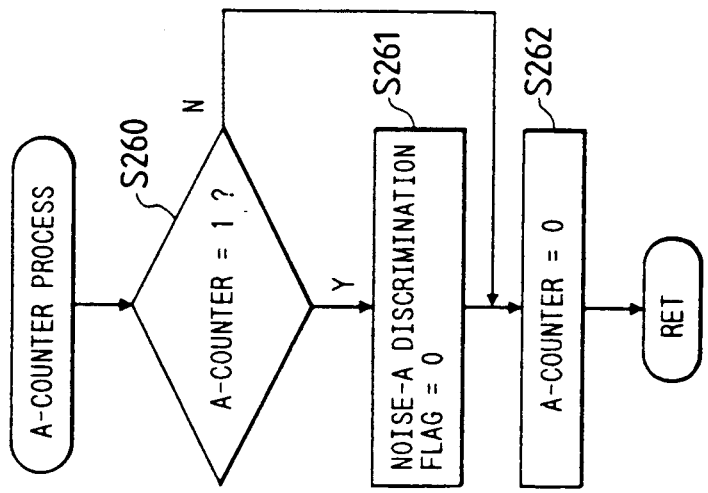

FIG. 13B is similar to FIG. 13A, so explanation thereof is omitted. It is obvious that the C-counter processing and D-counter processing in FIG. 4 can similarly be implemented only by changing symbols A and B in the flowchart in FIG. 13A and 13B to C and D, respectively.

Figure 15:
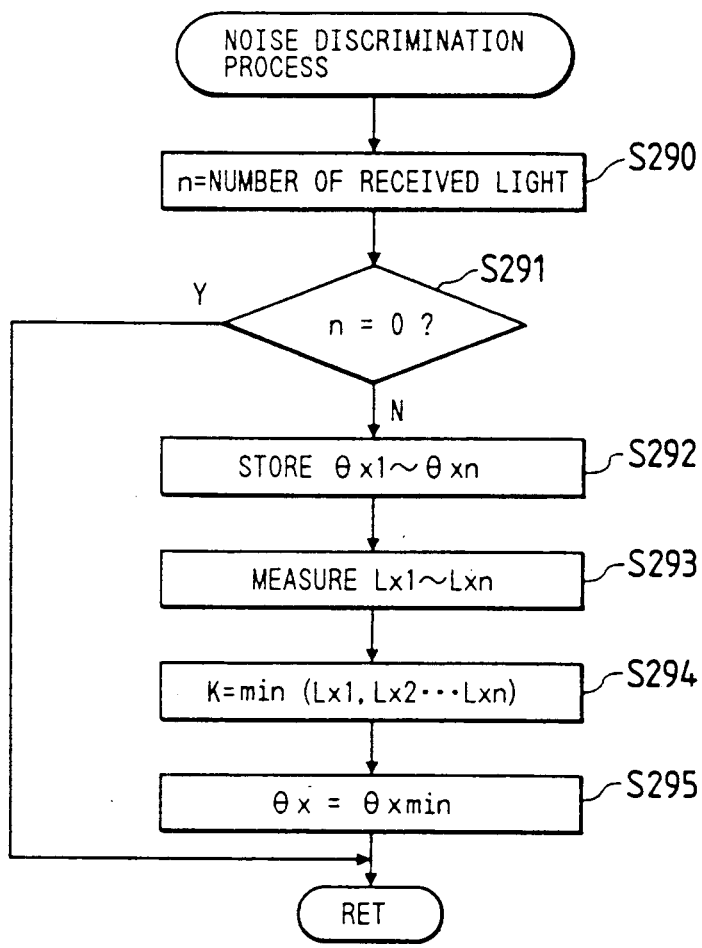
FIG. 15 is a flowchart showing the second method of noise discrimination processing.

In the above described noise discrimination processing, if the beam signals more than two have been detected in the single predicted azimuth range, either one of the firstly detected two light sources is determined to be the expected reference point. According to the experiment by the present inventors, it is considered that such noise discrimination processing is sufficient for practical use. However, when the beam signals more than two ar received in the single predicted azimuth range, the positional detection precision of the moving vehicle 1 can also be improved by comparing the distances between the moving vehicle 1 and all sources of the detected light and by determining that the light source closest to the moving vehicle 1 is the expected reference point. An example of such noise discrimination processing is shown in the flowchart of FIG. 15.

In the same figure, in step S290, the number of beam signals "n" detected in the predicted azimuth range is counted and that number is stored.

In step S291, it is determined whether or not any light beam signal is detected.

In step S292, the azimuthes $\theta x1$ to $\theta xn$ of the detected light sources are all stored.

In step S293, each of the distances Lxl to Lxn between the individuals of the light sources and the moving vehicle 1 is measured and stored.

In step S294, the detection order K=min (Lx1, Lx2, ... Lxn) of the light source of the shortest distance among the Lxl to Lxn is decided and stored as a K-value.

In step S295, the latest azimuth $\theta x$ is renewed with the azimuth $\theta xmin$ of the light source which exists at the shortest distance from the moving vehicle 1.

By such noise discrimination processing, even if beam , signals more than two are detected in the predicted azimuth range, the expected reference point can reliably be discriminated among them.

As describe above, in the present embodiment it is determined whether or not the light detected by the light beam receiver 3 is one reflected from the reflector at the expected reference point on the basis of whether or not the reflected light is detected in the predicted azimuth range, and if it is the normal light reflected from the expected reflector 6, the position and advance direction of the moving vehicle 1 are calculated on the basis of the azimuth of the reflected light.

When the lights reflected by unexpected reflecting objects other than the normal reflector are received in the predicted azimuth range, the source of the reflected light which is closest to the moving vehicle 1 is regarded as the expected reflector 6 in order to prevent the reflected light from the unexpected reflecting object from being mistaken for the normal reflected light. In the distance measurement for detecting the reflected light source which is closest to the moving vehicle 1, the rotational speed of the light beam source 2 and the light beam receiver 3 is decreased, and if it is necessary, the moving vehicle 1 is stopped or made to travel slowly.

If any reflected light is not received and a reference point is missed, the azimuth of the missing reference point is presumed on the basis of the azimuthes at which corresponding beam signals were detected in the last and before-last scan cycles, and according to the presumed azimuth, the position and advance direction of the moving vehicle 1 are calculated.

If the consecutive missing number of times of a certain reference point exceeds a predetermined number of times, the position of the moving vehicle 1 may be detected on the basis of the remaining three reference point except the certain reference point to continuously provide steering control. Simultaneously, based on the coordinates and azimuthes of the remaining three reference points except the missing reference point, the azimuth of the missing reference point is reversely calculated. The azimuth obtained by the reverse calculation is based on the determined azimuthes and coordinate positions of the three reference points and has a high detection precision, different from mere presumption of an azimuth.

As described above, even if the light reflected from a reference point is not normally detected because of a temporary obstacle, the traveling of the moving vehicle 1 can be continued along a predetermined travel course.

Furthermore, when two reference points are successively missed, it is presumed that there is a serious trouble so that travel of the moving vehicle 1 is allowed to stop at the time when the missing number of times has exceeded a prescribed number of times.

Moreover, while the moving vehicle 1 is adapted to stop at once in the case where it is judged that three reference points have been missed in the present example. Therefore, even if a plurality of reference points are repeatedly missed, the moving vehicle 1 never departs from a predetermined travel course.

A predetermined number of times may also be set for the case in that three reference points are successively missed, and the moving vehicle 1 may be stopped after the missing number of times has exceeded the predetermined number of times.

When consecutive missing number of times of a reference point has been reached to such a value that the normal steering control is not expected because of the accumulation of errors in the reference point presumption, that is, when the missing number of times has exceeded the threshold value T1, control is done on the basis of the information of the remaining three reference points, so that the positional detection error does not become so large. Accumulation of errors due to the presumption of a missing reference point is almost nullified when the azimuth of the missing reference point is reversely calculated on the basis of other known values.

While missing processing is effected or the moving vehicle 1 is allowed to stop when the reference point or points have been missed by the prescribed number of times in the present embodiment, such missing processing may be effected or the moving vehicle 1 may be stop in such a case where reference point or points have been missed during a prescribed period of time or during the moving vehicle 1 has traveled by a predetermined distance.

Furthermore, although the present embodiment is constructed in such that when the light reflected by a particular reflector is not received so that the reference point has been lost, an azimuth of the reference point lost is presumed on the basis of the azimuthes which have been obtained by detecting beam signals received in the last and the before-last detection cycles, respectively, until the missing number of times has exceeded the predetermined value and the position and the advance direction of the moving vehicle 1 are calculated in accordance with the presumed reference point so that the steering of the moving vehicle is conducted. However, it may be constructed in such that the azimuth is presumed, thereafter, the presumed azimuth is used only for the detection of the reference point in the next cycle, the calculation for the position and the advance direction of the moving vehicle 1 in this cycle is cancelled, and travel of the vehicle is continued in the same advance direction is in the last cycle without any modification.

While the moving vehicle 1 has been adapted, in the present embodiment, to be driven by the radio control or the like from a returning position R to a starting position for working, it may be possible that the light beam is scanned during the moving vehicle 1 stays at the returning position R to detect the azimuthes of the reference points, and a traveling course extending from the returning position R to the starting position for working is operated on the basis of the detected azimuthes, whereby the moving vehicle 1 is allowed to travel to the starting position for working along the operated traveling course. In this case, it is preferably to perform the discrimination process of the reference points during traveling from the returning position to the starting position for working.

Although the present embodiment is the one in which the present invention has been applied to such a system that the position and the advance direction of the moving vehicle 1 are detected on the basis of four reference points thereby effecting steering control, the present invention is not limited thereto, and applicable also to such a system that reference points positioned at the apexes of a triangle surrounding the moving vehicle 1 are detected among four reference points, the position and the advance direction of the moving vehicle 1 are detected on the basis of the positional information on the above three reference points thereby effecting steering control, and such system is described in the U.S. Ser. No. 413,934 (Japanese Patent Application No. 63-262191).

More specifically, the system according to the present invention may be constructed in such that when one reference point has been missed, the position and the advance direction of the moving vehicle 1 are detected on the basis of such three reference points which are not limited to the reference points positioned at the apexes of a triangle surrounding the moving vehicle 1 among four reference points, but the other three reference points than that having missed, whereby steering control of the moving vehicle 1 is carried out.

The present invention can be applied to a control system wherein the position and advance direction of a moving vehicle are detected on the basis of the azimuthes of three reference points.

Although, in the embodiment above mentioned, description has been made on the case in which the distances are measured for discriminating a plurality of beam signals detected in the single predicted azimuth range, the positional detection precision of a moving vehicle can be improved in the control system of the above-mentioned U.S. Pat. Ser. No. 344574 by automatically reducing the rotational speed of the light beam source and the light beam receiver, similarly to the present embodiment, and if it is desirable, by stopping the moving vehicle or slowing the travel speed thereof, in the case that the distance between the moving vehicle and the light-reflecting means is measured in order to calculate the coordinates of the light-reflecting means.

The following effects can be accomplished according to the present invention.

(1) Since the light beam scanning speed is automatically reduced and if it is desirous or necessary, the moving vehicle can be stopped or slowed down to carry out the distance measurement with enough accuracy, only when a need for measuring the distance between the moving vehicle and a reference point occurs, the precision of distance measurement increases. As a result, position detection with a high precision combined with a distance measuring function is possible, providing little reduction of the work efficiency (travel speed and the like) of the moving vehicle.

(2) Light beam can be scanned at a high speed when there is no need for distance measurement, so that the positional detection precision of the moving vehicle can be improved without reducing the positional detection efficiency thereof.

(3) The normal reflecting mean and other reflecting objects can be discriminated by a simple means of comparing the respective distances between the moving vehicle and the normal reflecting means and other reflecting objects, so it is possible to increase the positional detection precision of the moving vehicle without complexing the control system.

(4) Even if a reference point has been temporarily missed, the azimuth of the missing reference point can be presumed and the traveling of the moving vehicle can be continued on the basis of the presumed azimuth, so there is no useless work interruption, whereby the work efficiency is improved.

What is claimed is:

1. A position-detecting system for a moving vehicle wherein the position of the moving vehicle is detected by scanning the light beam emitted from a light beam emitting means mounted on the moving vehicle in the circumferential direction centering around the moving body, and receiving the light beam reflected from light-reflecting means disposed at at least three positions by means of a light-receiving means mounted on the moving vehicle, comprising;

a light beam scanning means provided on the moving vehicle for scanning the light beam in the circumferential direction centering around the moving vehicle, an azimuth detecting means for detecting the azimuthes of the respective light-reflecting means on the basis of the light-receiving intervals of the light-receiving means, differential azimuth operation means for operating the differential azimuthes between the reference points viewed from the moving vehicle on the basis of the azimuthes, a means for detecting the distance between the source of the reflected light received at the light-receiving means and the moving vehicle, a means for calculating the position of the moving vehicle on the basis of the positional information and azimuthes of the reference points, and a means for reducing the rotational speed of the light beam scanning means in response to the operation of the distance detecting means.

2. A position-detecting system for a moving vehicle as claimed in claim 1 further comprising a means for slowing the travel speed of the moving vehicle or stopping it during the distance detecting means operates.

3. A position-detecting system for a moving vehicle as claimed in claim 1 further comprising;
- a means for predicting the azimuth range in which each light-reflecting means is to be detected in the next scan, on the basis of the azimuth of each light-reflecting means detected by the azimuth detecting means,
- means for selecting one of the plurality of reflected lights on the basis of the distances between the respective sources of the plurality of reflected lights and the moving vehicle when a plurality of reflected lights are detected in single predicted azimuth range in a same scan, and
- means for calculating the position of the moving vehicle on the basis of the detected azimuth of the selected reflected light.

4. A position-detecting system for a moving vehicle claimed in claim 2 further comprising:
- a means for predicting the azimuth range in which each light-reflecting means is to be detected n the next scan, on the basis of the azimuth of each light-reflecting means detected by the azimuth detecting means,
- means for selecting one of the plurality of reflected lights on the basis of the distances between the respective sources of the plurality of reflected lights and the moving vehicle when a plurality of reflected lights are detected in single predicted azimuth range in a same scan,
- means for calculating the position of the moving vehicle on the basis of the detected azimuth of the selected reflected light.

5. A position-detecting system for a moving vehicle wherein the position of the moving vehicle is detected by scanning the light beam emitted from a light beam emitting means mounted on the moving vehicle in the circumferential direction centering around the moving body, and receiving the light beam reflected from light-reflecting means disposed at at least three positions by means of a light-receiving means mounted on the moving vehicle, comprising;
- a light beam scanning means provided on the moving vehicle for scanning the light beam in the circumferential direction centering around the moving vehicle,
- an azimuth detecting means for detecting the azimuthes of the respective light-reflecting means on the basis of the light-receiving intervals of the light-receiving means, a means for predicting the azimuth range in which each light-reflecting means is to be detected in the next scan, on the basis of the azimuth of each light-reflecting means detected by the azimuth detecting means,
- a means for detecting the distance between the source of the reflected light received at the light-receiving means and the moving vehicle,
- a means for calculating the position of the moving vehicle on the basis of the azimuth of the reflected light when the position of the source of the reflected light detected by the light-receiving means is in the azimuth predicted by the azimuth range prediction means, means for selecting one of the plurality of reflected lights on the basis of the distances between the respective sources of the plurality of reflected lights and the moving vehicle when a plurality of reflected lights are detected in single predicted azimuth range in a same scan, and
- means for calculating the position of the moving vehicle on the basis of the detected azimuth of the selected reflected light, and
- a means for reducing the rotational speed of the light beam scanning means in response to the operation of the distance detecting means.

6. A position-detecting system for a moving vehicle as claimed in claim 3 further comprising a means for calculating the position of the moving vehicle on the basis of the azimuth of the light reflected by the light-reflecting means which is closest to the moving vehicle.

7. A position-detecting system for a moving vehicle as claimed in claim 4 further comprising a means for calculating the position of the moving vehicle on the basis of the azimuth of the light reflected by the light-reflecting means which is closest to the moving vehicle.

8. A position-detecting system for a moving vehicle as claimed in claim 5 further comprising a means for calculating the position of the moving vehicle on the basis of the azimuth of the light reflected by the light-reflecting means which is closest to the moving vehicle.

9. A position-detecting system for a moving vehicle as claimed in claim 3 further comprising:
- a means for calculating the position of the moving vehicle on the basis of the azimuth of the reflected !light detected at first in the predicted azimuth range, and
- a means for calculating the position of the moving vehicle on the basis of the azimuth of the secondly detected reflected light, if the distance between the moving vehicle and the source of the reflected light which is secondly detected is smaller than the distance between the moving vehicle and the source of the firstly detected reflected light in the predicted azimuth range in the same scan.

10. A position-detecting system for a moving vehicle as claimed in claim 4 further comprising:
- a means for calculating the position of the moving vehicle on the basis of the azimuth of the reflected light detected at first in the predicted azimuth range, and
- a means for calculating the position of the moving vehicle on the basis of the azimuth of the secondly detected reflected light, if the distance between the moving vehicle and the source of the reflected light which is secondly detected is smaller than the distance between the moving vehicle and the source of the firstly detected reflected light in the predicted azimuth range in the same scan.

11. A position-detection system for a moving vehicle as claimed in claim 5 further comprising:
- a means for calculating the position of the moving vehicle on the basis of the azimuth of the reflected light detected at first in the predicted azimuth range, and
- a means for calculating the position of the moving vehicle on the basis of the azimuth of the secondly detected reflected light, if the distance between the moving vehicle and the source of the reflected light which is secondly detected is smaller than the distance between the moving vehicle and the source of the firstly detected reflected light in the predicted azimuth range in the same scan.

* * * * *